US012770300B2

(12) United States Patent
Gupte et al.

(10) Patent No.: US 12,770,300 B2
(45) Date of Patent: Oct. 20, 2026

(54) SYSTEMS AND METHODS OF AUTOMATED IMAGING DOMAIN TRANSFER

(71) Applicant: QUALCOMM Incorporated, San Diego, CA (US)

(72) Inventors: Ajit Deepak Gupte, Bangalore (IN); Chiranjib Choudhuri, Bangalore (IN); Anupama S, Chennai (IN)

(73) Assignee: QUALCOMM Incorporated, San Diego, CA (US)

( * ) Notice: Subject to any disclaimer, the term of this patent is extended or adjusted under 35 U.S.C. 154(b) by 31 days.

(21) Appl. No.: 17/840,571

(22) Filed: Jun. 14, 2022

(65) Prior Publication Data

US 2023/0401673 A1 Dec. 14, 2023

(51) Int. Cl.
*G06T 11/10* (2026.01)
*G06T 5/50* (2006.01)
(Continued)

(52) U.S. Cl.
CPC ................ *G06T 11/10* (2026.01); *G06T 5/50* (2013.01); *G06T 15/04* (2013.01); *G06T 17/20* (2013.01);
(Continued)

(58) Field of Classification Search
CPC .. G06T 5/00; G06T 5/50; G06T 15/04; G06T 17/20; G06T 2207/10024;
(Continued)

(56) References Cited

U.S. PATENT DOCUMENTS

2018/0158246 A1 6/2018 Grau et al.
2019/0122411 A1* 4/2019 Sachs ........................ G06T 7/90
(Continued)

FOREIGN PATENT DOCUMENTS

WO 2020064521 A1 4/2020

OTHER PUBLICATIONS

Yudin, D. A., Dolzhenko, A. V., & Kapustina, E. O. (Sep. 2019). The usage of grayscale or color images for facial expression recognition with deep neural networks. In International Conference on Neuroinformatics (pp. 271-281). Cham: Springer International Publishing.*
(Continued)

*Primary Examiner* — Sarah Lhymn
(74) *Attorney, Agent, or Firm* — Polsinelli LLP/QUALCOMM Incorporated

(57) ABSTRACT

Imaging systems and techniques are described. An imaging system receives, from an image sensor, image(s) of a user (e.g., in a pose and/or with a facial expression). The image sensor captures the first set of image(s) in a first electromagnetic (EM) frequency domain, such as the infrared and/or near-infrared domain. The imaging system generates a representation of the user in the first pose in a second EM frequency domain (e.g., visible light domain) at least in part by inputting the image(s) into one or more trained machine learning models. The representation of the user is based on an image property associated with image data of at least the part of the user in the second EM frequency domain. The imaging system outputs the representation of the user in the pose in the second EM frequency domain.

30 Claims, 16 Drawing Sheets

(51) Int. Cl.
*G06T 15/04* (2011.01)
*G06T 17/20* (2006.01)

(52) U.S. Cl.
CPC ............... *G06T 2207/10024* (2013.01); *G06T 2207/10048* (2013.01); *G06T 2207/20081* (2013.01); *G06T 2207/20084* (2013.01); *G06T 2207/30201* (2013.01)

(58) Field of Classification Search
CPC . G06T 2207/10048; G06T 2207/20081; G06T 2207/20084; G06T 2207/30201; G06T 11/001
See application file for complete search history.

(56) References Cited

U.S. PATENT DOCUMENTS

| | | | | |
|---|---|---|---|---|
| 2020/0402284 | A1 | 12/2020 | Saragih et al. | |
| 2023/0077010 | A1 * | 3/2023 | Zhang | G06V 40/176 |

OTHER PUBLICATIONS

International Search Report and Written Opinion—PCT/US2023/066181—ISA/EPO—Aug. 18, 2023.

* cited by examiner

SYSTEMS AND METHODS OF AUTOMATED IMAGING DOMAIN TRANSFER

FIELD

This application is related to image processing. More specifically, this application relates to systems and methods of image processing to use input image data that is captured in a first electromagnetic frequency domain (e.g., an infrared (IR) and/or near-infrared (NIR) domain) to automatically generate output image data in a second electromagnetic frequency domain (e.g., a visible light domain, which can be referred to as a red-green-blue (RGB) domain).

BACKGROUND

Network-based interactive systems allow users to interact with one another over a network, in some cases even when those users are geographically remote from one another. Network-based interactive systems can include video conferencing technologies in which user's devices capture and send video and/or audio to other user's devices while receiving video and/or audio captured by other user's devices, so that the users in the video conference can see and hear one another. Network-based interactive systems can include network-based multiplayer games, such as massively multiplayer online (MMO) games. Network-based interactive systems can include extended reality (XR) technologies that immerse a user in an environment that is at least partially virtual, such as virtual reality (VR), augmented reality (AR), or mixed reality (MR).

In some examples, network-based interactive systems may use cameras to obtain image data of a user. Visible light images captured by visible light cameras of scenes with very dim or bright illumination in the visible light domain can appear unclear, for instance appearing underexposed or overexposed. Cameras that capture infrared (IR) or near-infrared (NIR) image data can capture clear image data in scenes with very dim or very bright visible light illumination. However, image data captured using IR or NIR cameras generally cannot be incorporated into a visible light scene without appearing out of place and breaking immersion, since many objects, such as people, appear different in the IR or NIR domain than they do in the visible light domain.

BRIEF SUMMARY

In some examples, systems and techniques are described for image processing. Imaging systems and techniques are described. An imaging system receives, from an image sensor, image(s) of a user (e.g., the user's face) in a pose (e.g., a head position, a head orientation, and/or a facial expression). The image sensor captures the image(s) in a first electromagnetic (EM) frequency domain, such as the infrared and/or near-infrared domain. The imaging system generates a representation of the part of the user in the first pose in a second EM frequency domain (e.g., visible light domain) at least in part by inputting the image(s) into one or more trained machine learning models. The representation of the user is based on an image property (e.g., color information) associated with image data of at least some of the user in the second EM frequency domain. The imaging system outputs the representation of the user in the pose in the second EM frequency domain.

In one example, an apparatus for imaging is provided. The apparatus includes a memory and one or more processors (e.g., implemented in circuitry) coupled to the memory. The one or more processors are configured to and can: receive, from an image sensor, one or more images of a user in a pose, wherein the image sensor captures the one or more images in a first electromagnetic (EM) frequency domain; generate a representation of the user in the pose in a second EM frequency domain at least in part by inputting at least the one or more images into one or more trained machine learning models, wherein the representation of the user is based on an image property associated with image data of the user in the second EM frequency domain; and output the representation of the user in the pose in the second EM frequency domain.

In another example, a method of imaging is provided. The method includes: receiving, from an image sensor, one or more images of a user in a pose, wherein the image sensor captures the one or more images in a first electromagnetic (EM) frequency domain; generating a representation of the user in the pose in a second EM frequency domain at least in part by inputting at least the one or more images into one or more trained machine learning models, wherein the representation of the user is based on an image property associated with image data of the user in the second EM frequency domain; and outputting the representation of at least the part the user in the pose in the second EM frequency domain.

In another example, a non-transitory computer-readable medium is provided that has stored thereon instructions that, when executed by one or more processors, cause the one or more processors to: receive, from an image sensor, one or more images of a user in a pose, wherein the image sensor captures the one or more images in a first electromagnetic (EM) frequency domain; generate a representation of the user in the pose in a second EM frequency domain at least in part by inputting at least the one or more images into one or more trained machine learning models, wherein the representation of the user is based on an image property associated with image data of the user in the second EM frequency domain; and output the representation of the user in the pose in the second EM frequency domain.

In another example, an apparatus for imaging is provided. The apparatus includes: means for receiving, from an image sensor, one or more images of a user in a pose, wherein the image sensor captures the one or more images in a first electromagnetic (EM) frequency domain; means for generating a representation of the user in the pose in a second EM frequency domain at least in part by inputting at least the one or more images into one or more trained machine learning models, wherein the representation of the user is based on an image property associated with image data of the user in the second EM frequency domain; and means for outputting the representation of at least the part the user in the pose in the second EM frequency domain.

In some aspects, outputting the representation of the user in the pose in the second EM frequency domain includes including the representation of the user in the pose in the second EM frequency domain in training data, the training data to be used to train a second set of one or more machine learning models using the representation of the user in the pose in the second EM frequency domain.

In some aspects, outputting the representation of the user in the pose in the second EM frequency domain includes training a second set of one or more machine learning models using the representation of the user in the pose in the second EM frequency domain as training data, wherein the second set of one or more machine learning models are configured to generate a three-dimensional mesh for an avatar of the user and a texture to apply to the three-dimensional mesh for the avatar of the user based on providing image data in the first EM frequency domain into the second set of one or more machine learning models.

In some aspects, outputting the representation of the user in the pose in the second EM frequency domain includes inputting the representation of the user in the pose in the second EM frequency domain into a second set of one or more machine learning models, wherein the second set of one or more machine learning models are configured to generate a three-dimensional mesh for an avatar of the user and a texture to apply to the three-dimensional mesh for the avatar of the user based on input of the representation of the user in the pose in the second EM frequency domain into the second set of one or more machine learning models.

In some aspects, the second EM frequency domain includes a visible light frequency domain, and wherein the first EM frequency domain is distinct from the visible light frequency domain. In some aspects, the first EM frequency domain includes least one of an infrared (IR) frequency domain or a near-infrared (NIR) frequency domain.

In some aspects, one or more of the methods, apparatuses, and computer-readable medium described above further comprise: storing the image data of the user in the second EM frequency domain, and wherein inputting at least the one or more images into the one or more trained machine learning models includes also inputting the image data into the one or more trained machine learning models.

In some aspects, the one or more images of the user depict the user in a pose, the representation of the user in the second EM frequency represents the user in the pose, and the pose includes at least one of a position of at least a part of the user, an orientation of at least the part of the user, or a facial expression of the user.

In some aspects, the representation of the user in the pose in the second EM frequency domain includes a texture in the second EM frequency domain, wherein the texture is configured to apply to a three-dimensional mesh representation of the user in the pose. In some aspects, the representation of the user in the pose in the second EM frequency domain includes three-dimensional model of the user in the pose that is textured using a texture in the second EM frequency domain. In some aspects, the representation of the user in the pose in the second EM frequency domain includes a rendered image of a three-dimensional model of the user in the pose and from a specified perspective, wherein the rendered image is in the second EM frequency domain. In some aspects, the representation of the user in the pose in the second EM frequency domain includes an image of the user in the pose in the second EM frequency domain.

In some aspects, the image property includes color information, and wherein at least one color in the representation of the user in the pose in the second EM frequency domain is based on the color information associated with the image data of the user in the second EM frequency domain.

In some aspects, the one or more trained machine learning models have training that is specific to the user.

In some aspects, the one or more trained machine learning models are trained using a first image of the user in the first EM frequency domain and a second image of the user in the second EM frequency domain, wherein the first image of the user in the first EM frequency domain is generated by a second set of one or more machine learning models based on input of the second image of the user in the second EM frequency domain into the second set of one or more machine learning models.

In some aspects, outputting the representation of the user in the pose in the second EM frequency domain includes causing the representation of the user in the pose in the second EM frequency domain to be displayed using at least the display. In some aspects, outputting the representation of the user in the pose in the second EM frequency domain includes causing the representation of the user in the pose in the second EM frequency domain to be transmitted to at least a recipient device using at least a communication interface.

In some aspects, the method is performed using an apparatus that includes at least one of a head-mounted display (HMD), a mobile handset, or a wireless communication device. In some aspects, the method is performed using an apparatus that includes one or more network servers, wherein receiving the one or more images includes receiving the one or more images from a user device over a network, and wherein outputting the representation of the user in the pose in the second EM frequency domain includes causing the representation of the user in the pose in the second EM frequency domain to be transmitted from the one or more network servers to the user device over the network.

In some aspects, the apparatus is part of, and/or includes a wearable device, an extended reality device (e.g., a virtual reality (VR) device, an augmented reality (AR) device, or a mixed reality (MR) device), a head-mounted display (HMD) device, a wireless communication device, a mobile device (e.g., a mobile telephone and/or mobile handset and/or so-called "smart phone" or other mobile device), a camera, a personal computer, a laptop computer, a server computer, a vehicle or a computing device or component of a vehicle, another device, or a combination thereof.

In some aspects, the apparatus includes a camera or multiple cameras for capturing one or more images. In some aspects, the apparatus further includes a display for displaying one or more images, notifications, and/or other displayable data. In some aspects, the apparatuses described above can include one or more sensors (e.g., one or more inertial measurement units (IMUs), such as one or more gyroscopes, one or more gyrometers, one or more accelerometers, any combination thereof, and/or other sensor).

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and aspects, will become more apparent upon referring to the following specification, claims, and accompanying drawings.

BRIEF DESCRIPTION OF THE DRAWINGS

Illustrative aspects of the present application are described in detail below with reference to the following drawing figures.

DETAILED DESCRIPTION

Figure 1:
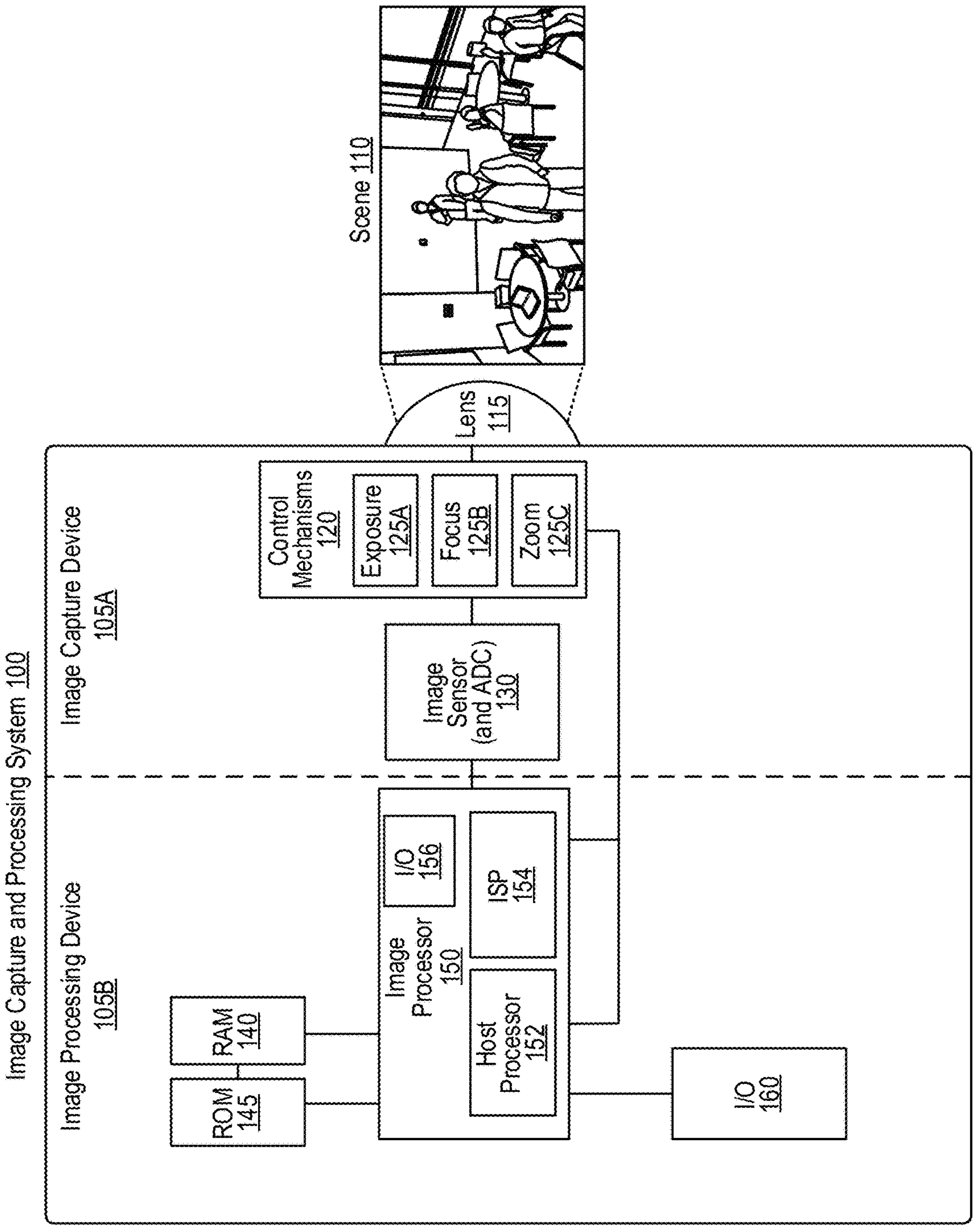
FIG. 1 is a block diagram illustrating an example architecture of an image capture and processing system, in accordance with some examples.

Certain aspects of this disclosure are provided below. Some of these aspects may be applied independently and some of them may be applied in combination as would be apparent to those of skill in the art. In the following description, for the purposes of explanation, specific details are set forth in order to provide a thorough understanding of aspects of the application. However, it will be apparent that various aspects may be practiced without these specific details. The figures and description are not intended to be restrictive.

The ensuing description provides example aspects only, and is not intended to limit the scope, applicability, or configuration of the disclosure. Rather, the ensuing description of the example aspects will provide those skilled in the art with an enabling description for implementing an example aspect. It should be understood that various changes may be made in the function and arrangement of elements without departing from the spirit and scope of the application as set forth in the appended claims.

A camera is a device that receives light and captures image frames, such as still images or video frames, using an image sensor. The terms “image,” “image frame,” and “frame” are used interchangeably herein. Cameras can be configured with a variety of image capture and image processing settings. The different settings result in images with different appearances. Some camera settings are determined and applied before or during capture of one or more image frames, such as ISO, exposure time, aperture size, f/stop, shutter speed, focus, and gain. For example, settings or parameters can be applied to an image sensor for capturing the one or more image frames. Other camera settings can configure post-processing of one or more image frames, such as alterations to contrast, brightness, saturation, sharpness, levels, curves, or colors. For example, settings or parameters can be applied to a processor (e.g., an image signal processor or ISP) for processing the one or more image frames captured by the image sensor.

Extended reality (XR) systems or devices can provide virtual content to a user and/or can combine real-world views of physical environments (scenes) and virtual environments (including virtual content). XR systems facilitate user interactions with such combined XR environments. The real-world view can include real-world objects (also referred to as physical objects), such as people, vehicles, buildings, tables, chairs, and/or other real-world or physical objects. XR systems or devices can facilitate interaction with different types of XR environments (e.g., a user can use an XR system or device to interact with an XR environment). XR systems can include virtual reality (VR) systems facilitating interactions with VR environments, augmented reality (AR) systems facilitating interactions with AR environments, mixed reality (MR) systems facilitating interactions with MR environments, and/or other XR systems. Examples of XR systems or devices include head-mounted displays (HMDs), smart glasses, among others. In some cases, an XR system can track parts of the user (e.g., a hand and/or fingertips of a user) to allow the user to interact with items of virtual content.

Video conferencing is a network-based technology that allows multiple users, who may each be in different locations, to connect in a video conference over a network using respective user devices that generally each include displays and cameras. In video conferencing, each camera of each user device captures image data representing the user who is using that user device, and sends that image data to the other user devices connected to the video conference, to be displayed on the display of the other users who use those other user devices. Meanwhile, the user device displays image data representing the other users in the video conference, captured by the respective cameras of the other user devices that those other users use to connect to the video conference. Video conferencing can be used by a group of users to virtually speak face-to-face while users are in different locations. Video conferencing can be a valuable way to users to virtually meet with each other despite travel restrictions, such as those related to a pandemic. Video conferencing can be performed using user devices that connect to each other, in some cases through one or more servers. In some examples, the user devices can include laptops, phones, tablet computers, mobile handsets, video game consoles, vehicle computers, desktop computers, wearable devices, televisions, media centers, XR systems, or other computing devices discussed herein.

Network-based interactive systems allow users to interact with one another over a network, in some cases even when those users are geographically remote from one another. Network-based interactive systems can include video conferencing technologies such as those described above. Network-based interactive systems can include extended reality (XR) technologies, such as those described above. At least a portion of an XR environment displayed to a user of an XR device can be virtual, in some examples including representations of other users that the user can interact with in the XR environment. Network-based interactive systems can include network-based multiplayer games, such as massively multiplayer online (MMO) games. Network-based interactive systems can include network-based interactive environment, such as “metaverse” environments.

In some examples, a network-based interactive system may use image sensors and/or cameras to obtain image data of a user. For instance, this can allow the network-based interactive system to present the image data of the user to other users of the network-based interactive system. Capturing and presenting image data of the user can allow the user’s facial expressions, head pose, body pose, and other movement(s) to be presented to the user, in real-time or with a brief delay. Different cameras and/or image sensors can capture image data in different electromagnetic (EM) frequency domains, such as the visible light domain, an infrared (IR) and/or near-infrared (NIR) domain, and the like.

In some examples, a user can use a head-mounted display (HMD) apparatus while using a network-based interactive system. Traditionally, there is no way to capture images of the user’s face, especially the user’s eyes, while the user is wearing an HMD apparatus, because the HMD apparatus covers the user’s eyes and/or other portion of the user’s face. Placing cameras that capture images in the visible light domain along an interior of the HMD may require light source(s) along the interior of the HMD apparatus to provide illumination of the user’s eye(s) and/or face in the visible light domain. Providing illumination of the user’s eye(s) and/or face in the visible light domain, however, would distract the user and/or interfere with the user’s viewing of display(s) in the interior of the HMD apparatus.

Placing cameras that capture images in the IR and/or NIR domain along an interior of the HMD may allow images of the user’s eyes and/or face to be captured, with light source(s) along the interior of the HMD apparatus to provide illumination of the user’s eye(s) and/or face in the IR and/or NIR domain. Illumination of the user’s eye(s) and/or face in the IR and/or NIR domain is generally not perceivable by the user, and therefore does not distract the user and/or interfere with the user’s viewing of display(s) in the interior of the HMD apparatus. However, direct incorporation of images captured in the IR and/or NIR domain into an environment (e.g., XR environment) that is shown in the visible light domain may appear out of place and may break immersion for a viewer. Furthermore, images in the IR and/or NIR domain are generally represented in greyscale (with different shades of grey representing different IR and/or NIR frequencies), while images in the visible light domain are generally represented in color (e.g., with red, green, and/or blue color channels). To incorporate images captured in the IR and/or NIR domain into an environment that is shown in the visible light domain, the systems and methods described herein can use trained machine learning (ML) model(s) to convert images captured in the IR and/or NIR domain into the visible light domain. The trained machine learning (ML) model(s) can be trained for a specific user, so that the trained machine learning (ML) model(s) can know what colors to use for different parts of a user’s body (e.g., skin color, eye (iris) color, hair color) and different objects that the user is wearing (e.g., clothing color and/or color of accessories such as glasses or jewelry) in the domain transfer from the IR and/or NIR domain to the visible light domain.

In some examples, systems and techniques are described for image processing. In some examples, an imaging system receives image(s) of a user in a pose (e.g., with a facial expression) from an image sensor. The image sensor captures the first set of image(s) in a first electromagnetic (EM) frequency domain, such as the infrared and/or near-infrared domain. The imaging system generates a representation of at least a part of the user (e.g., the face of the user) in the first pose (e.g., head position, head orientation, and/or facial expression) in a second EM frequency domain (e.g., visible light domain) at least in part by inputting the image(s) into one or more trained machine learning models. The representation of at least the part of the user is based on an image property (e.g., color information) associated with image data of at least the part of the user in the second EM frequency domain. The imaging system outputs the representation of at least the part the user in the pose in the second EM frequency domain. The first EM frequency domain and the second EM frequency domain can be at least partially distinct from one another.

In some examples, the images can include partial views of the user’s face, for instance views of individual eyes, the mouth, and the like. In some examples, the representation of the user in the pose in the second EM frequency domain is used to train a second set of one or more ML models that generate avatar data (e.g., three-dimensional (3D) mesh and/or a texture for the mesh) for a 3D avatar of at least the part (e.g., the face) the user. Generating the 3D avatar of the user can allow the imaging system to generate rendered images of at least the part (e.g., the face) of the user from a different perspective than the perspective(s) in the image(s) captured using the image sensor.

In some examples, the imaging system trains a second set of one or more ML models to convert image data from the second EM frequency domain (e.g., visible light domain) into the first EM frequency domain (e.g., IR and/or NIR). The imaging system can then use this second set of one or more ML models as training data for training the one or more ML models that convert image data from the first EM frequency domain (e.g., IR and/or NIR) into the second EM frequency domain (e.g., visible light domain). In some examples, the one or more ML models, and/or the second set of one or more ML models, can be trained to be person-independent or person-specific.

In some examples, imaging systems and techniques described herein can be used for any of the types of network-based interactive systems described herein, such as video conferencing, XR, multiplayer gaming, metaverse interactivity, or combinations thereof. For instance, the imaging systems and techniques described herein can be used for an XR video conferencing system in which input images are captured in the IR and/or NIR domain, and a reconstructed 3D avatar is generated with a texture in the visible light domain, with realistic real-time facial expression and other indications of pose. The imaging systems and techniques described herein can also be used for face detection, facial recognition, face tracking, and/or face retrieval for cameras that capture images in the NIR and/or IR domain (e.g., security images captured by security cameras), since most algorithms for face detection, facial recognition, face tracking, and/or face retrieval function better with images in the visible light domain than with images in the IR and/or NIR domain.

The imaging systems and techniques described herein provide a number of technical improvements over prior imaging systems. For instance, the imaging systems and techniques described herein allow for real-time face tracking even in situations where the user's face is obscured, for instance when the user is wearing an HMD apparatus on their face. The imaging systems and techniques described herein allow for thus through the use of illumination inside the HMD apparatus in the IR and/or NIR domain (e.g., so as not to distract the user or interfere with viewing of the displays of the HMD apparatus), cameras inside the HMD apparatus that capture image(s) in the IR and/or NIR domain, and trained ML model(s) that can convert the image(s) from the IR and/or NIR domain into the visible light domain. The imaging systems and techniques described herein allow for 3D avatars of the user to be generated in the visible light domain from images captured in the IR and/or NIR domain, for instance either by inputting the output of the domain transfer ML model(s) into secondary ML model(s) that generate the 3D avatar mesh and/or texture, or by inputting the output of the domain transfer ML model(s) into a loss function for training the secondary ML model(s) that generate the 3D avatar mesh and/or texture, with the latter option providing an additional improvement in speed. The imaging systems and techniques described herein allow for improved face detection, facial recognition, face tracking, and/or face retrieval for cameras that capture images in the NIR and/or IR domain (e.g., security images captured by security cameras), since most algorithms for face detection, facial recognition, face tracking, and/or face retrieval function better with images in the visible light domain than with images in the IR and/or NIR domain.

Various aspects of the application will be described with respect to the figures. FIG. 1 is a block diagram illustrating an architecture of an image capture and processing system 100. The image capture and processing system 100 includes various components that are used to capture and process images of one or more scenes (e.g., an image of a scene 110). The image capture and processing system 100 can capture standalone images (or photographs) and/or can capture videos that include multiple images (or video frames) in a particular sequence. A lens 115 of the system 100 faces a scene 110 and receives light from the scene 110. The lens 115 bends the light toward the image sensor 130. The light received by the lens 115 passes through an aperture controlled by one or more control mechanisms 120 and is received by an image sensor 130. In some examples, the scene 110 is a scene in an environment. In some examples, the scene 110 is a scene of at least a portion of a user. For instance, the scene 110 can be a scene of one or both of the user's eyes, and/or at least a portion of the user's face.

The one or more control mechanisms 120 may control exposure, focus, and/or zoom based on information from the image sensor 130 and/or based on information from the image processor 150. The one or more control mechanisms 120 may include multiple mechanisms and components; for instance, the control mechanisms 120 may include one or more exposure control mechanisms 125A, one or more focus control mechanisms 125B, and/or one or more zoom control mechanisms 125C. The one or more control mechanisms 120 may also include additional control mechanisms besides those that are illustrated, such as control mechanisms controlling analog gain, flash, HDR, depth of field, and/or other image capture properties.

The focus control mechanism 125B of the control mechanisms 120 can obtain a focus setting. In some examples, focus control mechanism 125B store the focus setting in a memory register. Based on the focus setting, the focus control mechanism 125B can adjust the position of the lens 115 relative to the position of the image sensor 130. For example, based on the focus setting, the focus control mechanism 125B can move the lens 115 closer to the image sensor 130 or farther from the image sensor 130 by actuating a motor or servo, thereby adjusting focus. In some cases, additional lenses may be included in the system 100, such as one or more microlenses over each photodiode of the image sensor 130, which each bend the light received from the lens 115 toward the corresponding photodiode before the light reaches the photodiode. The focus setting may be determined via contrast detection autofocus (CDAF), phase detection autofocus (PDAF), or some combination thereof. The focus setting may be determined using the control mechanism 120, the image sensor 130, and/or the image processor 150. The focus setting may be referred to as an image capture setting and/or an image processing setting.

The exposure control mechanism 125A of the control mechanisms 120 can obtain an exposure setting. In some cases, the exposure control mechanism 125A stores the exposure setting in a memory register. Based on this exposure setting, the exposure control mechanism 125A can control a size of the aperture (e.g., aperture size or f/stop), a duration of time for which the aperture is open (e.g., exposure time or shutter speed), a sensitivity of the image sensor 130 (e.g., ISO speed or film speed), analog gain applied by the image sensor 130, or any combination thereof. The exposure setting may be referred to as an image capture setting and/or an image processing setting.

The zoom control mechanism 125C of the control mechanisms 120 can obtain a zoom setting. In some examples, the zoom control mechanism 125C stores the zoom setting in a memory register. Based on the zoom setting, the zoom control mechanism 125C can control a focal length of an assembly of lens elements (lens assembly) that includes the lens 115 and one or more additional lenses. For example, the zoom control mechanism 125C can control the focal length of the lens assembly by actuating one or more motors or servos to move one or more of the lenses relative to one another. The zoom setting may be referred to as an image capture setting and/or an image processing setting. In some examples, the lens assembly may include a parfocal zoom lens or a varifocal zoom lens. In some examples, the lens assembly may include a focusing lens (which can be lens 115 in some cases) that receives the light from the scene 110 first, with the light then passing through an afocal zoom system between the focusing lens (e.g., lens 115) and the image sensor 130 before the light reaches the image sensor 130. The afocal zoom system may, in some cases, include two positive (e.g., converging, convex) lenses of equal or similar focal length (e.g., within a threshold difference) with a negative (e.g., diverging, concave) lens between them. In some cases, the zoom control mechanism 125C moves one or more of the lenses in the afocal zoom system, such as the negative lens and one or both of the positive lenses.

The image sensor 130 includes one or more arrays of photodiodes or other photosensitive elements. Each photodiode measures an amount of light that eventually corresponds to a particular pixel in the image produced by the image sensor 130. In some cases, different photodiodes may be covered by different color filters, and may thus measure light matching the color of the filter covering the photodiode. For instance, Bayer color filters include red color filters, blue color filters, and green color filters, with each pixel of the image generated based on red light data from at least one photodiode covered in a red color filter, blue light data from at least one photodiode covered in a blue color filter, and green light data from at least one photodiode covered in a green color filter. Other types of color filters may use yellow, magenta, and/or cyan (also referred to as "emerald") color filters instead of or in addition to red, blue, and/or green color filters. Some image sensors may lack color filters altogether, and may instead use different photodiodes throughout the pixel array (in some cases vertically stacked). The different photodiodes throughout the pixel array can have different spectral sensitivity curves, therefore responding to different wavelengths of light. Monochrome image sensors may also lack color filters and therefore lack color depth.

In some cases, the image sensor 130 may alternately or additionally include opaque and/or reflective masks that block light from reaching certain photodiodes, or portions of certain photodiodes, at certain times and/or from certain angles, which may be used for phase detection autofocus (PDAF). The image sensor 130 may also include an analog gain amplifier to amplify the analog signals output by the photodiodes and/or an analog to digital converter (ADC) to convert the analog signals output of the photodiodes (and/or amplified by the analog gain amplifier) into digital signals. In some cases, certain components or functions discussed with respect to one or more of the control mechanisms 120 may be included instead or additionally in the image sensor 130. The image sensor 130 may be a charge-coupled device (CCD) sensor, an electron-multiplying CCD (EMCCD) sensor, an active-pixel sensor (APS), a complimentary metal-oxide semiconductor (CMOS), an N-type metal-oxide semiconductor (NMOS), a hybrid CCD/CMOS sensor (e.g., sCMOS), or some other combination thereof.

The image processor 150 may include one or more processors, such as one or more image signal processors (ISPs) (including ISP 154), one or more host processors (including host processor 152), and/or one or more of any other type of processor 1510 discussed with respect to the computing system 1500. The host processor 152 can be a digital signal processor (DSP) and/or other type of processor. In some implementations, the image processor 150 is a single integrated circuit or chip (e.g., referred to as a system-on-chip or SoC) that includes the host processor 152 and the ISP 154. In some cases, the chip can also include one or more input/output ports (e.g., input/output (I/O) ports 156), central processing units (CPUs), graphics processing units (GPUs), broadband modems (e.g., 3G, 4G or LTE, 5G, etc.), memory, connectivity components (e.g., Bluetooth™, Global Positioning System (GPS), etc.), any combination thereof, and/or other components. The I/O ports 156 can include any suitable input/output ports or interface according to one or more protocol or specification, such as an Inter-Integrated Circuit 2 (I2C) interface, an Inter-Integrated Circuit 3 (I3C) interface, a Serial Peripheral Interface (SPI) interface, a serial General Purpose Input/Output (GPIO) interface, a Mobile Industry Processor Interface (MIPI) (such as a MIPI CSI-2 physical (PHY) layer port or interface, an Advanced High-performance Bus (AHB) bus, any combination thereof, and/or other input/output port. In one illustrative example, the host processor 152 can communicate with the image sensor 130 using an I2C port, and the ISP 154 can communicate with the image sensor 130 using an MIPI port.

The image processor 150 may perform a number of tasks, such as de-mosaicing, color space conversion, image frame downsampling, pixel interpolation, automatic exposure (AE) control, automatic gain control (AGC), CDAF, PDAF, automatic white balance, merging of image frames to form an HDR image, image recognition, object recognition, feature recognition, receipt of inputs, managing outputs, managing memory, or some combination thereof. The image processor 150 may store image frames and/or processed images in random access memory (RAM) 140 and/or 1520, read-only memory (ROM) 145 and/or 1525, a cache, a memory unit, another storage device, or some combination thereof.

Various input/output (I/O) devices 160 may be connected to the image processor 150. The I/O devices 160 can include a display screen, a keyboard, a keypad, a touchscreen, a trackpad, a touch-sensitive surface, a printer, any other output devices 1535, any other input devices 1545, or some combination thereof. In some cases, a caption may be input into the image processing device 105B through a physical keyboard or keypad of the I/O devices 160, or through a virtual keyboard or keypad of a touchscreen of the I/O devices 160. The I/O 160 may include one or more ports, jacks, or other connectors that enable a wired connection between the system 100 and one or more peripheral devices, over which the system 100 may receive data from the one or more peripheral device and/or transmit data to the one or more peripheral devices. The I/O 160 may include one or more wireless transceivers that enable a wireless connection between the system 100 and one or more peripheral devices, over which the system 100 may receive data from the one or more peripheral device and/or transmit data to the one or more peripheral devices. The peripheral devices may include any of the previously-discussed types of I/O devices 160 and may themselves be considered I/O devices 160 once they are coupled to the ports, jacks, wireless transceivers, or other wired and/or wireless connectors.

In some cases, the image capture and processing system 100 may be a single device. In some cases, the image capture and processing system 100 may be two or more separate devices, including an image capture device 105A (e.g., a camera) and an image processing device 105B (e.g., a computing device coupled to the camera). In some implementations, the image capture device 105A and the image processing device 105B may be coupled together, for example via one or more wires, cables, or other electrical connectors, and/or wirelessly via one or more wireless transceivers. In some implementations, the image capture device 105A and the image processing device 105B may be disconnected from one another.

As shown in FIG. 1, a vertical dashed line divides the image capture and processing system 100 of FIG. 1 into two portions that represent the image capture device 105A and the image processing device 105B, respectively. The image capture device 105A includes the lens 115, control mechanisms 120, and the image sensor 130. The image processing device 105B includes the image processor 150 (including the ISP 154 and the host processor 152), the RAM 140, the ROM 145, and the I/O 160. In some cases, certain components illustrated in the image capture device 105A, such as the ISP 154 and/or the host processor 152, may be included in the image capture device 105A.

The image capture and processing system 100 can include an electronic device, such as a mobile or stationary telephone handset (e.g., smartphone, cellular telephone, or the like), a desktop computer, a laptop or notebook computer, a tablet computer, a set-top box, a television, a camera, a display device, a digital media player, a video gaming console, a video streaming device, an Internet Protocol (IP) camera, or any other suitable electronic device. In some examples, the image capture and processing system 100 can include one or more wireless transceivers for wireless communications, such as cellular network communications, 1502.11 wi-fi communications, wireless local area network (WLAN) communications, or some combination thereof. In some implementations, the image capture device 105A and the image processing device 105B can be different devices. For instance, the image capture device 105A can include a camera device and the image processing device 105B can include a computing device, such as a mobile handset, a desktop computer, or other computing device.

While the image capture and processing system 100 is shown to include certain components, one of ordinary skill will appreciate that the image capture and processing system 100 can include more components than those shown in FIG. 1. The components of the image capture and processing system 100 can include software, hardware, or one or more combinations of software and hardware. For example, in some implementations, the components of the image capture and processing system 100 can include and/or can be implemented using electronic circuits or other electronic hardware, which can include one or more programmable electronic circuits (e.g., microprocessors, GPUs, DSPs, CPUs, and/or other suitable electronic circuits), and/or can include and/or be implemented using computer software, firmware, or any combination thereof, to perform the various operations described herein. The software and/or firmware can include one or more instructions stored on a computer-readable storage medium and executable by one or more processors of the electronic device implementing the image capture and processing system 100.

Figure 2:
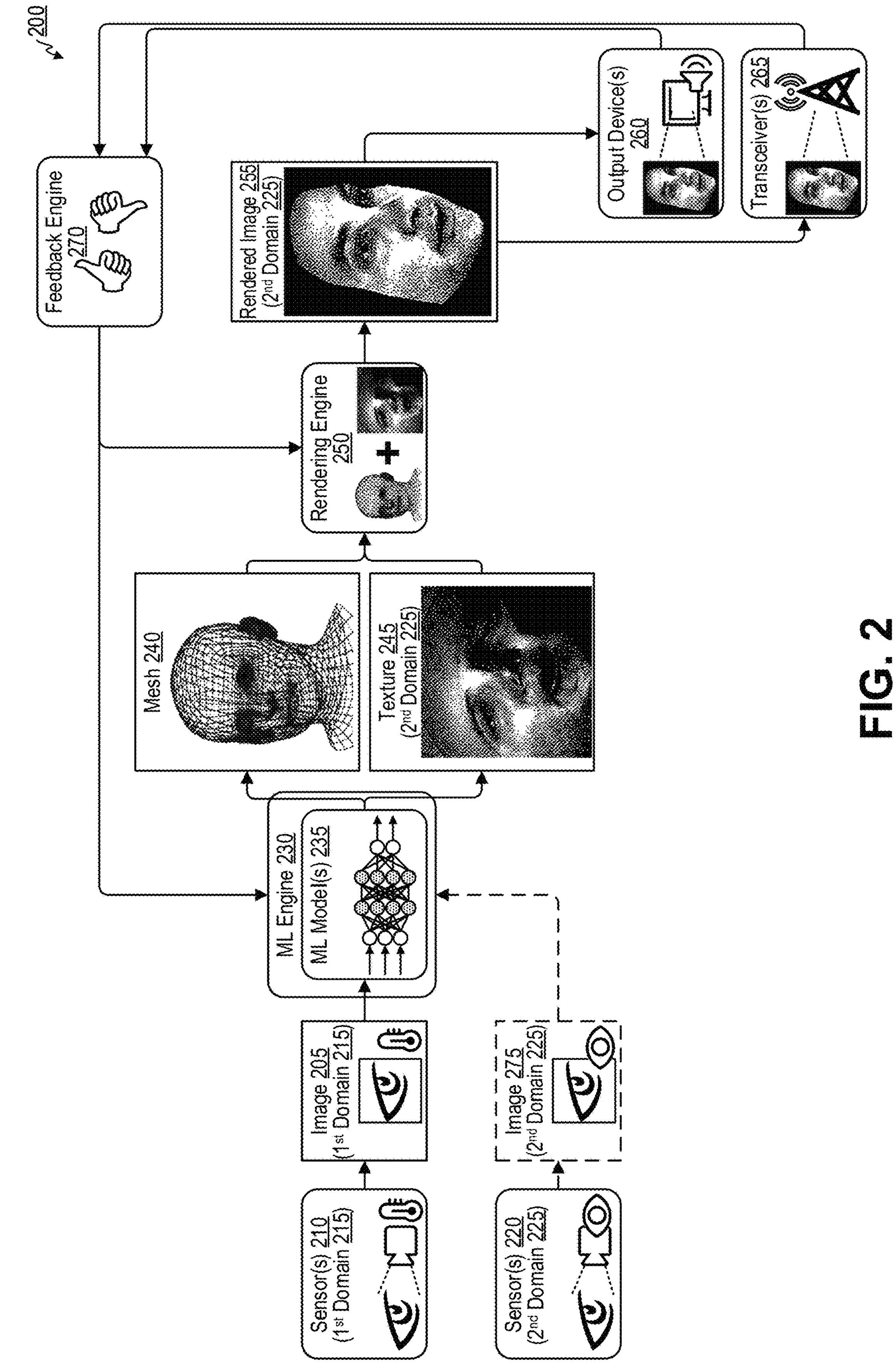
FIG. 2 is a block diagram illustrating an example architecture of imaging process performed using an imaging system, in accordance with some examples.

FIG. 2 is a block diagram illustrating an example architecture of imaging process performed using an imaging system 200. The imaging system 200 can include at least one computing system 1500. The imaging system 200, and the corresponding imaging process, can be used in network-based interactive system applications, such as those for video conferencing, extended reality (XR), video gaming, metaverse environments, or combinations thereof.

The imaging system 200 includes one or more sensors 210 that capture image data (e.g., an image 205) in a first electromagnetic (EM) frequency domain 215. In some examples, the imaging system 200 includes one or more sensors 220 that capture image data (e.g., an image 275) in a second EM frequency domain 215. An EM frequency domain (such as the first EM frequency domain 215 and/or the second EM frequency domain 225) refers to a range of EM frequencies along the EM spectrum. In some examples, an EM frequency domain (such as the first EM frequency domain 215 and/or the second EM frequency domain 225) corresponds to a specified type of EM radiation, such as radio waves, microwaves, infrared (IR), near-infrared (NIR), visible light, near-ultraviolet (NUV), ultraviolet (UV), X-rays, gamma rays, and/or combinations thereof.

In some examples, the first EM frequency domain 215 and the second EM frequency domain 225 include different ranges of frequencies relative to one another. In some examples, the first EM frequency domain 215 and the second EM frequency domain 225 include one or more overlapping ranges of frequencies. In an illustrative example, the first EM frequency domain 215 includes the infrared (IR) frequency domain and/or the near-infrared (NIR) frequency domain. For the sake of illustration, a thermometer icon (representing IR and/or NIR) is used herein to refer to the first EM frequency domain 215 in FIG. 2 and FIGS. 5-11. It should be understood that this is illustrative, and that the first EM frequency domain 215 can additionally or alternatively include any other frequency range, such as any frequency range(s) corresponding to one or more of any of the specified types of EM radiation listed above. In an illustrative example, the second EM frequency domain 225 includes the visible light frequency domain. For the sake of illustration, an eye icon (representing visible light) is used herein to refer to the second EM frequency domain 225 in FIG. 2 and FIGS. 5-11. It should be understood that this is illustrative, and that the second EM frequency domain 225 can additionally or alternatively include any other frequency range, such as any frequency range(s) corresponding to one or more of any of the specified types of EM radiation listed above.

In some examples, the one or more sensors 210 are directed at least a portion of a user, so that the image 205 and/or the image 275 are image(s) of at least the portion of a user. For example, the one or more sensors 210 and/or the one or more sensors 220 can be directed at (e.g., have in their respective fields of view (FOV)) one or both eyes of the user, the mouth of the user, the nose of the user, the cheeks of the user, the eyebrows of the user, the chin of the user, the jaw of the user, one or both ears of the user, the forehead of the user, the hair of the user, at least a subset of the face of the user, at least a subset of the head of the user, at least a subset of the upper body of the user, at least a subset of the torso of the user, one or both arms of the user, one or both shoulders of the user, one or both hands of the user, another portion of the user, one or both legs of the user, one or both feet of the user, or a combination thereof. The image 205 and/or the image 275 can be image(s) of any of these portion(s) of the user, and can therefore depict and/or represent any of these portion(s) of the user. Within FIG. 2, a graphic representing the sensor(s) 210 illustrates the sensor(s) 210 as including a camera (e.g., IR and/or NIR camera) facing an eye of the user. Within FIG. 2, a graphic representing the image 205 illustrates the image 205 as depicting an eye of the user (e.g., in the IR and/or NIR domain). Within FIG. 2, a graphic representing the sensor(s) 210 illustrates the sensor(s) 210 as including a camera (e.g., visible light camera) facing an eye of the user. Within FIG. 2, a graphic representing the image 275 illustrates the image 275 as depicting an eye of the user (e.g., in the visible light domain).

In some examples, the sensor(s) 210 and/or the sensor(s) 220 capture sensor data measuring and/or tracking information about aspects of the user, such as aspects of the face of the user, facial expressions by the user, aspects of the body of the user, behaviors by the user, gestures by the user, pose (e.g., position, orientations, gestures, and/or expression) of the user, or combinations thereof. The sensor(s) 210 and/or the sensor(s) 220 can include one or more cameras, image sensors, microphones, heart rate monitors, oximeters, biometric sensors, positioning receivers, Global Navigation Satellite System (GNSS) receivers, Inertial Measurement Units (IMUs), accelerometers, gyroscopes, gyrometers, barometers, thermometers, altimeters, depth sensors, light or sound-based sensors, such as a depth sensor using any suitable technology for determining depth (e.g., based on time of flight (ToF), structured light sensors, or light-based depth sensing techniques or systems) other sensors discussed herein, or combinations thereof. In some examples, the sensor(s) 210 and/or the sensor(s) 220 include camera(s) and/or image sensor(s), such as the include at least one image capture and processing system 100, image capture device 105A, image processing device 105B, the image sensor 130, or combination(s) thereof. In some examples, the sensor(s) 210 and/or the sensor(s) 220 include at least one input device 1545 of the computing system 1500. In some implementations, at least a first sensor of the sensor(s) 210 and/or the sensor(s) 220 may complement or refine sensor readings from at least a second sensor of the sensor(s) 210 and/or the sensor(s) 220. For example, audio data (e.g., of a voice) from one or more microphones may help to identify a pose of a user in the environment, and/or of the user's mouth. One or more IMUs, accelerometers, gyroscopes, or other sensors may be used to identify a pose (e.g., position and/or orientation) and/or any movement(s) of the imaging system 200 and/or of the user in the environment, which may help with image processing, for instance with stabilization and/or motion blur reduction.

The sensor(s) 210 capture the image 205 (in the first EM frequency domain 215) and provide the image 205 to a machine learning (ML) engine 230 and/or to one or more ML models 235 of the ML engine 230. The ML engine 230 can train the ML model(s) 235 and/or can manage interactions between different ML models of the ML model(s) 235. The ML engine 230, and/or the ML model(s) 235, can include, for example, one or more neural network (NNs) (e.g., neural network 1300), one or more convolutional neural networks (CNNs), one or more trained time delay neural networks (TDNNs), one or more deep networks, one or more autoencoders, one or more deep belief nets (DBNs), one or more recurrent neural networks (RNNs), one or more generative adversarial networks (GANs), one or more conditional generative adversarial networks (cGANs), one or more other types of neural networks, one or more trained support vector machines (SVMs), one or more trained random forests (RFs), one or more computer vision systems, one or more deep learning systems, one or more transformers, or combinations thereof. The ML engine 230, and/or the ML model(s) 235, can include, for example, the feature encoder 515, the avatar decoder 525, the rendering engine 535, the objective function 545, the feature encoder 615, the objective function 645, the domain transfer coder 815, the avatar coder 820, the loss function 850, the first set of ML model(s) 925, the feature encoder 930, the feature encoder 935, the image decoder 940, the second set of ML model(s) 1025, the feature encoder 1030, the feature encoder 1035, the image decoder 1040, the third set of ML model(s) 1125, the feature encoder 1130, the feature encoder 1135, the image decoder 1140, the neural network 1300, or a combination thereof. Within FIG. 2, a graphic representing the trained ML model(s) 235 illustrates a set of circles connected to another. Each of the circles can represent a node (e.g., node 1316), a neuron, a perceptron, a layer, a portion thereof, or a combination thereof. The circles are arranged in columns. The leftmost column of white circles represent an input layer (e.g., input layer 1310). The rightmost column of white circles represent an output layer (e.g., output layer 1314). Two columns of shaded circled between the leftmost column of white circles and the rightmost column of white circles each represent hidden layers (e.g., hidden layers 1312A-1312N).

In response to input of the image 205 (in the first EM frequency domain 215) and/or the image 275 to the ML model(s) 235, the ML model(s) 235 generate a three-dimensional (3D) mesh 240 and/or a texture 245 in the second EM frequency domain 225 (e.g., visible light). Respective examples of the mesh 240 and the texture 245 are illustrated in FIG. 2. A rendering engine 250 can apply the texture 245 to the mesh 240 to generate a 3D textured model of the user, which may be referred to as an avatar of the user. The rendering engine 250 may generate and/or render a rendered image 255 of the avatar of the user. The rendered image 255 may be a two-dimensional image of the avatar of the user (e.g., the texture 245 applied to the mesh 240) from a specified perspective in the second EM frequency domain 225 (e.g., visible light). An example of the rendered image 255 is illustrated in FIG. 2. In some examples, the ML engine 230 trains the ML model(s) 235 to generate the mesh 240 and/or texture 245 based on training data that includes one or more previously-generated meshes (e.g., similar to mesh 240), previously-generated textures for the meshes (e.g., similar to texture 245), and previously-captured image data (e.g., similar to the image 205 and/or the image 275) in the first EM frequency domain 215 and/or the second EM frequency domain 225. In some examples, the rendering engine 250 can also use the ML engine 230 and/or the ML model(s) 235 to generate the avatar and/or to generate the rendered image 255.

In such examples, the ML engine 230 can train the ML model(s) 235 (for use by the rendering engine 250) to generate the avatar by applying the texture 245 to the mesh 240 based on training data that includes previously-generated avatars along with corresponding meshes (e.g., similar to the mesh 240) and corresponding textures (e.g., similar to texture 245). The ML engine 230 can train the ML model(s) 235 (for use by the rendering engine 250) to generate the rendered image 255 based on training data that includes previously-generated rendered images (e.g., similar to the rendered image 255) along with corresponding previously-generated avatars, corresponding previously-generated meshes (e.g., similar to the mesh 240), and/or corresponding previously-generated textures (e.g., similar to texture 245). Within FIG. 2, a graphic representing the rendering engine 250 includes a depiction of the mesh 240 and a depicting of the texture 245 being combined into an avatar, the combination represented by an addition symbol.

The imaging system 200 outputs the rendered image 255, for instance by outputting the rendered image 255 using one or more output devices 260 and/or by sending the rendered image 255 to a recipient device using one or more transceivers 265. The imaging system 200 includes output device(s) 260. The output device(s) 260 can include one or more visual output devices, such as display(s) or connector(s) therefor. The output device(s) 260 can include one or more audio output devices, such as speaker(s), headphone(s), and/or connector(s) therefor. The output device(s) 260 can include one or more of the output device 1535 and/or of the communication interface 1540 of the computing system 1500. The imaging system 200 causes the display(s) of the output device(s) 260 to display the rendered image 255. Within FIG. 2, a graphic representing the output device(s) 260 illustrates a display and a speaker, with the display displaying the rendered image 255.

In some examples, the imaging system 200 includes one or more transceivers 265. The transceiver(s) 265 can include wired transmitters, receivers, transceivers, or combinations thereof. The transceiver(s) 265 can include wireless transmitters, receivers, transceivers, or combinations thereof. The transceiver(s) 265 can include one or more of the output device 1535 and/or of the communication interface 1540 of the computing system 1500. In some examples, the imaging system 200 causes the transceiver(s) 265 to send, to a recipient device, the rendered image 255. The recipient device can include a display or other output device(s) (e.g., such as the output device(s) 260), and the data sent to the recipient device from the transceiver(s) 265 can cause the recipient device to display and/or otherwise output the rendered image 255 using the display(s) and/or output device(s) of the recipient device. Within FIG. 2, a graphic representing the transceiver(s) 265 illustrates a wireless transceiver that is wirelessly transmitting the rendered image 255.

In some examples, the display(s) of the output device(s) 260 of the imaging system 200 function as optical "see-through" display(s) that allow light from the real-world environment (scene) around the imaging system 200 to traverse (e.g., pass) through the display(s) of the output device(s) 260 to reach one or both eyes of the user. For example, the display(s) of the output device(s) 260 can be at least partially transparent, translucent, light-permissive, light-transmissive, or a combination thereof. In an illustrative example, the display(s) of the output device(s) 260 includes a transparent, translucent, and/or light-transmissive lens and a projector. The display(s) of the output device(s) 260 of can include a projector that projects virtual content (e.g., the rendered image 255) onto the lens. The lens may be, for example, a lens of a pair of glasses, a lens of a goggle, a contact lens, a lens of a head-mounted display (HMD) device, or a combination thereof. Light from the real-world environment passes through the lens and reaches one or both eyes of the user. The projector can project virtual content (e.g., the rendered image 255) onto the lens, causing the virtual content to appear to be overlaid over the user's view of the environment from the perspective of one or both of the user's eyes. In some examples, the projector can project the virtual content onto the onto one or both retinas of one or both eyes of the user rather than onto a lens, which may be referred to as a virtual retinal display (VRD), a retinal scan display (RSD), or a retinal projector (RP) display.

In some examples, the display(s) of the output device(s) 260 of the imaging system 200 are digital "pass-through" display that allow the user of the imaging system 200 to see a view of an environment by displaying the view of the environment on the display(s) of the output device(s) 260. The view of the environment that is displayed on the digital pass-through display can be a view of the real-world environment around the imaging system 200, for example based on sensor data (e.g., images, videos, depth images, point clouds, other depth data, or combinations thereof) captured by one or more environment-facing sensors (e.g., of the sensor(s) 210 and/or the sensor(s) 220), in some cases as modified to include virtual content (e.g., the rendered image 255). The view of the environment that is displayed on the digital pass-through display can be a virtual environment (e.g., as in VR), which may in some cases include elements that are based on the real-world environment (e.g., boundaries of a room). The view of the environment that is displayed on the digital pass-through display can be an augmented environment (e.g., as in AR) that is based on the real-world environment. The view of the environment that is displayed on the digital pass-through display can be a mixed environment (e.g., as in MR) that is based on the real-world environment. The view of the environment that is displayed on the digital pass-through display can include virtual content (e.g., the rendered image 255) overlaid over other otherwise incorporated into the view of the environment.

In some examples, the imaging system 200 includes a feedback engine 270. The feedback engine 270 can detect feedback received from a user interface of the imaging system 200. The feedback may include feedback on the rendered image 255 as displayed (e.g., using the display(s) of the output device(s) 260). The feedback may include feedback on the rendered image 255 on its own or as used in context (e.g., as incorporated into an environment). The feedback may include feedback on the avatar of the user (e.g., the mesh 240 and/or the texture 245 and/or the combination thereof) that the rendered image 255 is generated from. The feedback may include feedback on the mesh 240 and/or the texture 245. The feedback may include feedback about the ML engine 230, the ML model(s) 235, the rendering engine 250, or a combination thereof.

The feedback engine 270 can detect feedback about one engine of the imaging system 200 received from another engine of the imaging system 200, for instance whether one engine decides to use data from the other engine or not. The feedback received by the feedback engine 270 can be positive feedback or negative feedback. For instance, if the one engine of the imaging system 200 uses data from another engine of the imaging system 200, or if positive feedback from a user is received through a user interface, the feedback engine 270 can interpret this as positive feedback. If the one engine of the imaging system 200 declines to data from another engine of the imaging system 200, or if negative feedback from a user is received through a user interface, the feedback engine 270 can interpret this as negative feedback. Positive feedback can also be based on attributes of the sensor data from the sensor(s) 210, such as the user smiling, laughing, nodding, saying a positive statement (e.g., "yes," "confirmed," "okay," "next"), or otherwise positively reacting to an output of one of the engines described herein, or an indication thereof. Negative feedback can also be based on attributes of the sensor data from the sensor(s) 210, such as the user frowning, crying, shaking their head (e.g., in a "no" motion), saying a negative statement (e.g., "no," "negative," "bad," "not this"), or otherwise negatively reacting to an output of one of the engines described herein, or an indication thereof.

In some examples, the feedback engine 270 provides the feedback to one or more ML systems of the imaging system 200 as training data, for instance to the ML engine 230 to update the one or more ML model(s) 235 of the imaging system 200 (e.g., in real-time). For instance, the feedback engine 270 can provide the feedback as training data to the ML system(s) and/or the ML model(s) 235 to update the training to generate the mesh 240, to generate the texture 245, to generate the avatar, to generate the rendered image 255, or a combination thereof. Positive feedback can be used to strengthen and/or reinforce weights associated with the outputs of the ML engine 230 and/or the ML model(s) 235, and/or to weaken or remove other weights other than those associated with the outputs of the ML engine 230 and/or the ML model(s) 235. Negative feedback can be used to weaken and/or remove weights associated with the outputs of the ML engine 230 and/or the ML model(s) 235, and/or to strengthen and/or reinforce other weights other than those associated with the outputs of the ML engine 230 and/or the ML model(s) 235. Within FIG. 2, a graphic representing the feedback engine 270 illustrates positive feedback (e.g., indicated by a thumbs-up icon) and negative feedback (e.g., indicated by a thumbs-down icon).

Figure 3A:
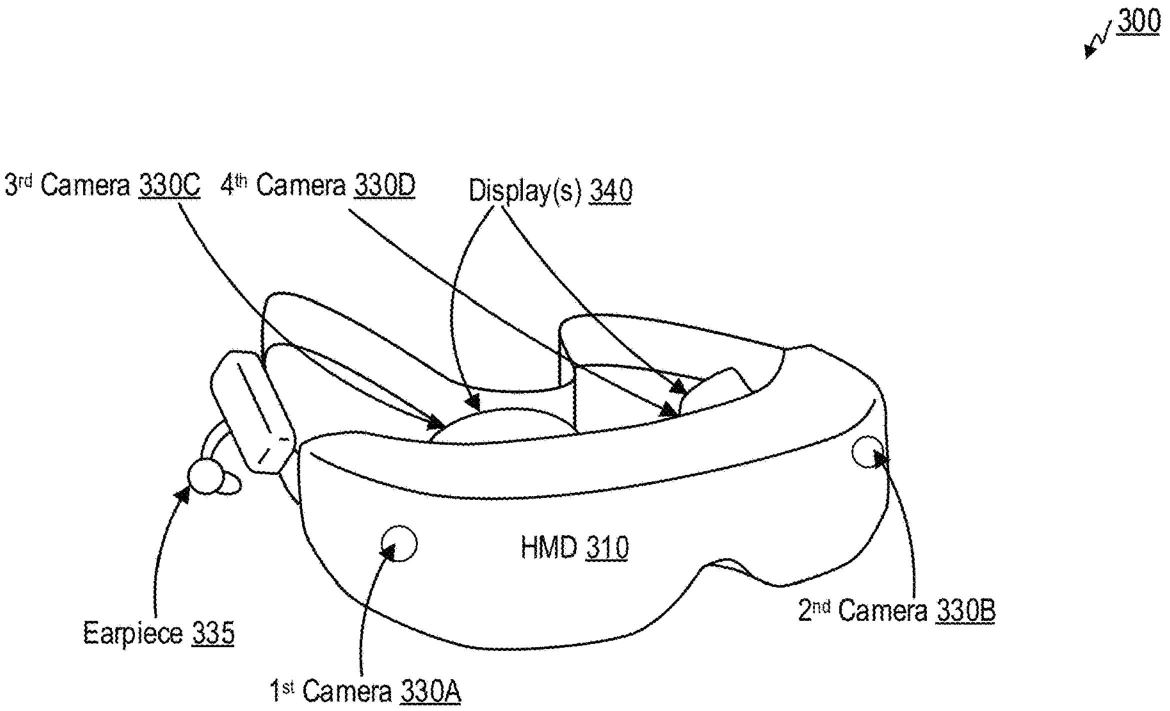
FIG. 3A is a perspective diagram illustrating a head-mounted display (HMD) that is used as part of an imaging system, in accordance with some examples.
Figure 3B:
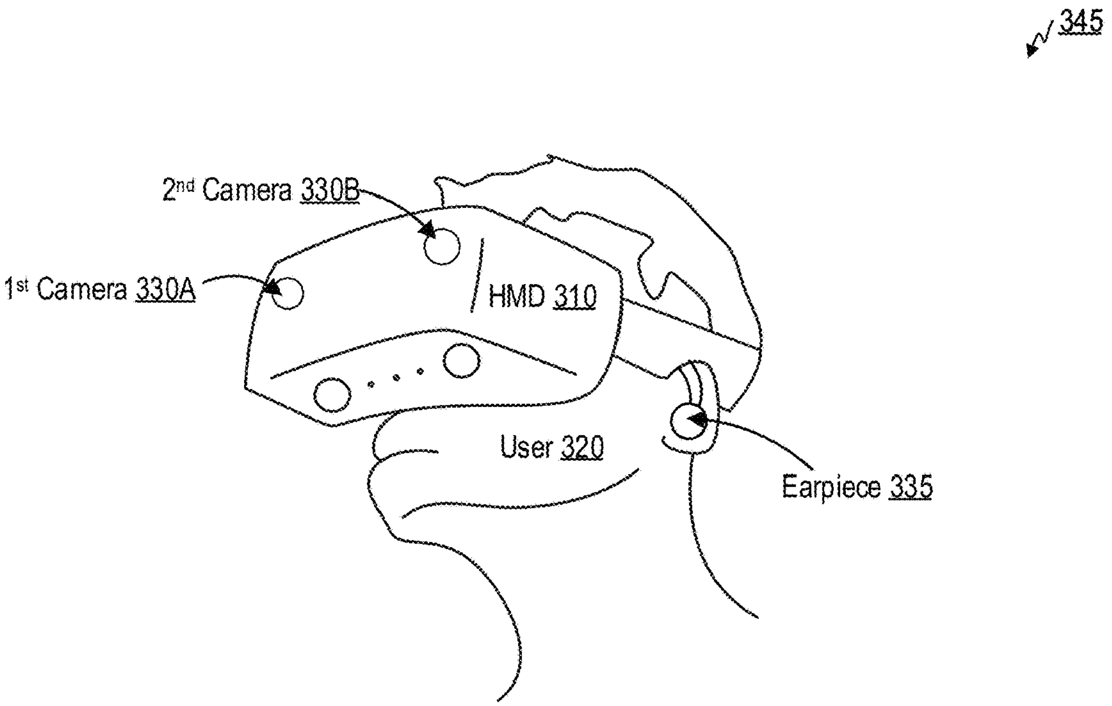
FIG. 3B is a perspective diagram illustrating the head-mounted display (HMD) of FIG. 3A being worn by a user, in accordance with some examples.
Figure 3C:
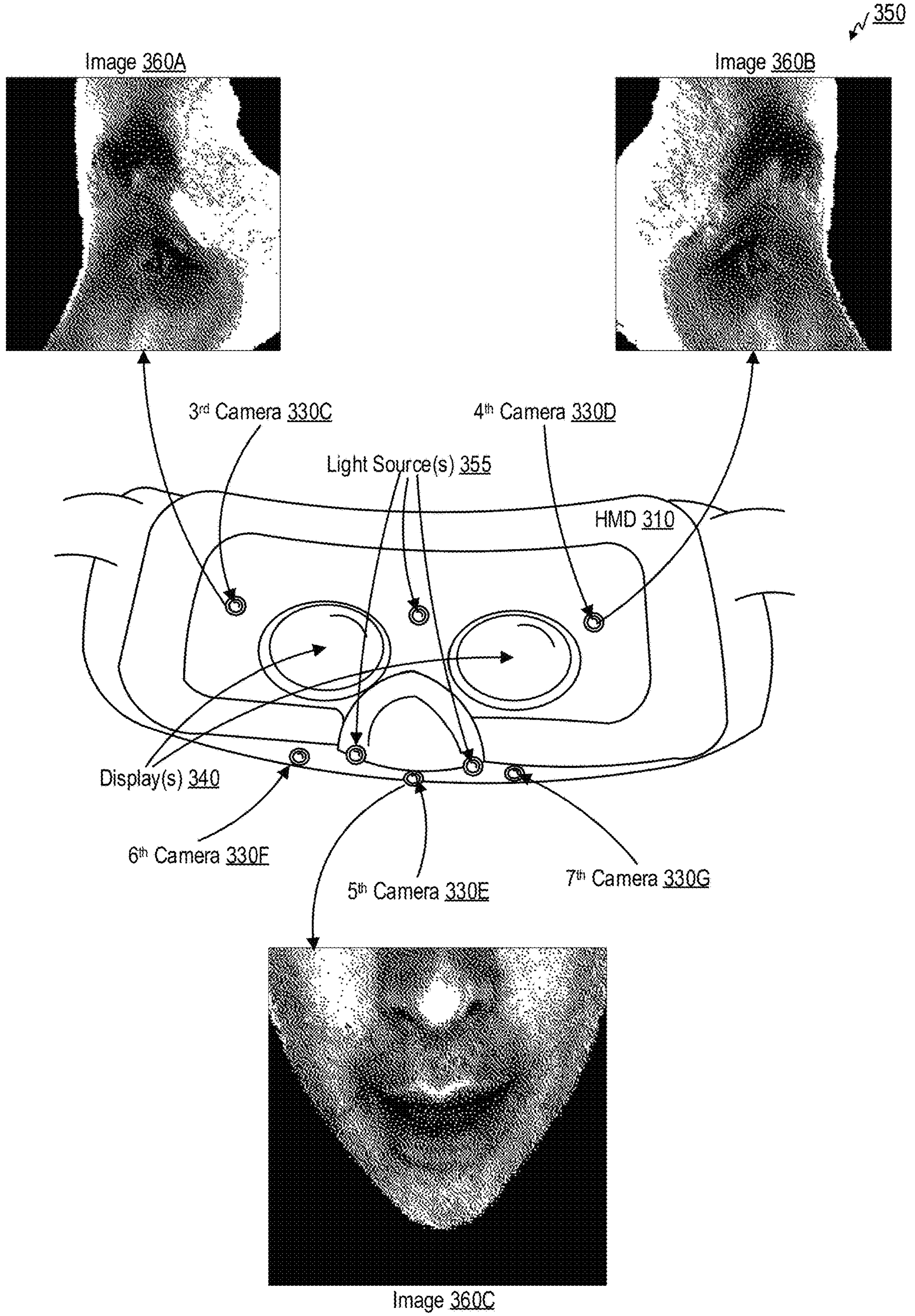
FIG. 3C is a perspective diagram illustrating an interior of the head-mounted display (HMD) of FIG. 3A, in accordance with some examples.

FIG. 3A is a perspective diagram 300 illustrating a head-mounted display (HMD) 310 that is used as part of an imaging system 200. The HMD 310 may be, for example, an augmented reality (AR) headset, a virtual reality (VR) headset, a mixed reality (MR) headset, an extended reality (XR) headset, or some combination thereof. The HMD 310 may be an example of a user device (e.g., imaging system 200) of an imaging system (e.g., imaging system 200). The HMD 310 includes a first camera 330A and a second camera 330B along a front portion of the HMD 310. The first camera 330A and the second camera 330B may be examples of the sensor(s) 210 and/or the sensor(s) 220 of the imaging system 200. The HMD 310 includes a third camera 330C and a fourth camera 330D facing the eye(s) of the user as the eye(s) of the user face the display(s) 340. The third camera 330C and the fourth camera 330D may be examples of the sensor(s) 210 and/or the sensor(s) 220 of the imaging system 200. In some examples, the HMD 310 may only have a single camera with a single image sensor. In some examples, the HMD 310 may include one or more additional cameras in addition to the first camera 330A, the second camera 330B, third camera 330C, and the fourth camera 330D, for instance as illustrated in FIG. 3C. In some examples, the HMID 310 may include one or more additional sensors in addition to the first camera 330A, the second camera 330B, third camera 330C, and the fourth camera 330D, which may also include other types of sensor(s) 210 and/or sensor(s) 220 of the imaging system 200. In some examples, the first camera 330A, the second camera 330B, third camera 330C, and/or the fourth camera 330D may be examples of the image capture and processing system 100, the image capture device 105A, the image processing device 105B, or a combination thereof.

The HMD 310 may include one or more displays 340 that are visible to a user 320 wearing the HMD 310 on the user 320's head. The one or more displays 340 of the HMD 310 can be examples of the one or more displays of the output device(s) 260 of the imaging system 200. In some examples, the HMD 310 may include one display 340 and two viewfinders. The two viewfinders can include a left viewfinder for the user 320's left eye and a right viewfinder for the user 320's right eye. The left viewfinder can be oriented so that the left eye of the user 320 sees a left side of the display. The right viewfinder can be oriented so that the right eye of the user 320 sees a right side of the display. In some examples, the HMD 310 may include two displays 340, including a left display that displays content to the user 320's left eye and a right display that displays content to a user 320's right eye. The one or more displays 340 of the HMD 310 can be digital "pass-through" displays or optical "see-through" displays.

The HMD 310 may include one or more earpieces 335, which may function as speakers and/or headphones that output audio to one or more ears of a user of the HMD 310, and may be examples of output device(s) 260. One earpiece 335 is illustrated in FIGS. 3A and 3B, but it should be understood that the HMD 310 can include two earpieces, with one earpiece for each ear (left ear and right ear) of the user. In some examples, the HMD 310 can also include one or more microphones (not pictured). The one or more microphones can be examples of the sensor(s) 210 and/or the sensor(s) 220 of the imaging system 200. In some examples, the audio output by the HMD 310 to the user through the one or more earpieces 335 may include, or be based on, audio recorded using the one or more microphones.

FIG. 3B is a perspective diagram 345 illustrating the head-mounted display (HMD) of FIG. 3A being worn by a user 320. The user 320 wears the HMD 310 on the user 320's head over the user 320's eyes. The HMD 310 can capture images with the first camera 330A and the second camera 330B. In some examples, the HMD 310 displays one or more output images toward the user 320's eyes using the display(s) 340. In some examples, the output images can include the rendered image 255. The output images can be based on the images captured by the first camera 330A and the second camera 330B (e.g., the image 205 and/or the image 275), for example with the virtual content (e.g., the rendered image 255) overlaid. The output images may provide a stereoscopic view of the environment, in some cases with the virtual content overlaid and/or with other modifications. For example, the HMD 310 can display a first display image to the user 320's right eye, the first display image based on an image captured by the first camera 330A. The HMD 310 can display a second display image to the user 320's left eye, the second display image based on an image captured by the second camera 330B. For instance, the HMD 310 may provide overlaid virtual content in the display images overlaid over the images captured by the first camera 330A and the second camera 330B. The third camera 330C and the fourth camera 330D can capture images of the eyes of the before, during, and/or after the user views the display images displayed by the display(s) 340. This way, the sensor data from the third camera 330C and/or the fourth camera 330D can capture reactions to the virtual content by the user's eyes (and/or other portions of the user). An earpiece 335 of the HMD 310 is illustrated in an ear of the user 320. The HMD 310 may be outputting audio to the user 320 through the earpiece 335 and/or through another earpiece (not pictured) of the HMD 310 that is in the other ear (not pictured) of the user 320.

FIG. 3C is a perspective diagram 350 illustrating an interior of the head-mounted display (HMD) 310 of FIG. 3A. The perspective diagram 350 of the interior of the HMD 310 shows examples of the display(s) 340, which have circular lenses for the user 320's eyes to look into in FIG. 3C. The perspective diagram 350 of the interior of the HMD 310 shows the third camera 330C and the fourth camera 330D, as well as a fifth camera 330E, a sixth camera 330F, and a seventh camera 330G. The third camera 330C, the fourth camera 330D, the fifth camera 330E, the sixth camera 330F, and the seventh camera 330G may be examples of the sensor(s) 210 and/or the sensor(s) 220 of the imaging system 200. In some examples, the third camera 330C, the fourth camera 330D, the fifth camera 330E, the sixth camera 330F, and the seventh camera 330G may be examples of the image capture and processing system 100, the image capture device 105A, the image processing device 105B, or a combination thereof. In some examples, the third camera 330C and the fourth camera 330D can be directed at the eyes of the user 320. For instance, the image 360A is an example of an image of the user 320's left eye as captured by the image sensor of the third camera 330C, and the image 360B is an example of an image of the user 320's right eye as captured by the image sensor of the fourth camera 330D. In some examples, the fifth camera 330E, the sixth camera 330F, and the seventh camera 330G can be directed at a mouth, nose, cheeks, chin, and/or jaw of the user. For instance, the image 360C is an example of an image of the user 320's mouth, nose, cheeks, chin, and jaw as captured by the image sensor of the fifth camera 330E.

In some examples, at least a subset of the cameras 330A-330G of the HMD 310 can capture image data in the first EM frequency domain 215 (e.g., IR and/or NR). In some examples, at least a subset of the cameras 330A-330G of the HMD 310 can capture image data in the second EM frequency domain 225 (e.g., visible light). In some examples, the HMD 310 can include one or more light sources 355. In some examples, at least a subset of the light source(s) 355 can provide light and/or illumination in the first EM frequency domain 215 (e.g., IR and/or NIR). In some examples, at least a subset of the light source(s) 355 can provide light and/or illumination in the second EM frequency domain 225 (e.g., visible light). One benefit to having the light source(s) 355 provide light and/or illumination in the IR and/or NIR domain is that the light source(s) 355 can provide light and/or illumination in the IR and/or NIR domain onto the user 310's eyes without the user 310's eyes seeing the IR and/or NTR light. If at least a subset of the cameras 330A-330G of the HMD 310 operate in the IR and/or NIR domain, then, these cameras can image the face of the user 320 with IR and/or NIR illumination without disrupting the user 320's viewing experience of the display(s) 340, since the interior of the HMD 310 remains invisible or dim in the visible light domain. In fact, the images 360A-360C are examples of images captured in the IR and/or NIR domain as illuminated using IR and/or NIR illumination from light source(s) 355.

Figure 4A:
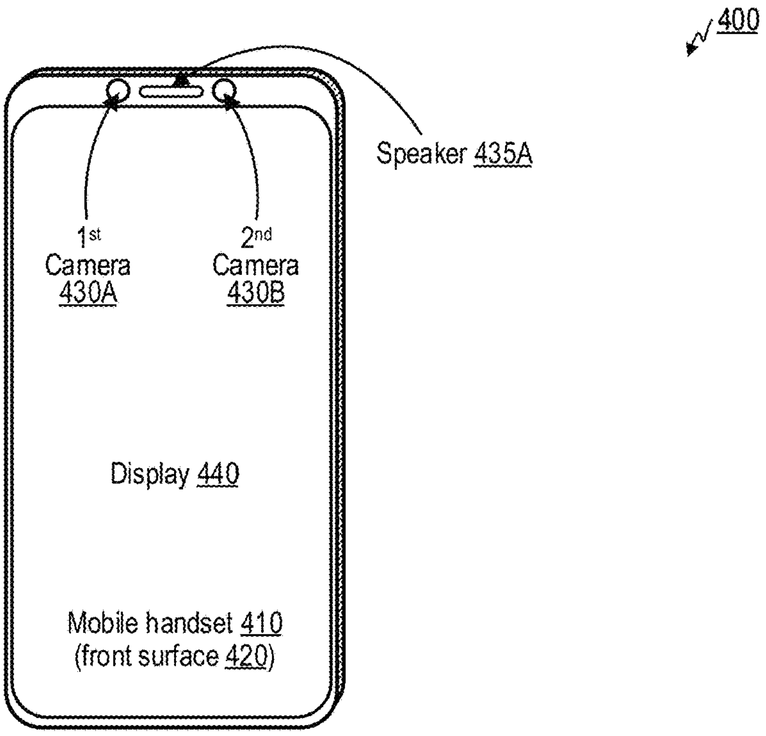
FIG. 4A is a perspective diagram illustrating a front surface of a mobile handset that includes front-facing cameras and that can be used as part of an imaging system, in accordance with some examples.

FIG. 4A is a perspective diagram 400 illustrating a front surface of a mobile handset 410 that includes front-facing cameras and can be used as part of an imaging system 200. The mobile handset 410 may be an example of user device (e.g., imaging system 200) of an imaging system (e.g., imaging system 200). The mobile handset 410 may be, for example, a cellular telephone, a satellite phone, a portable gaming console, a music player, a health tracking device, a wearable device, a wireless communication device, a laptop, a mobile device, any other type of computing device or computing system discussed herein, or a combination thereof.

The front surface 420 of the mobile handset 410 includes a display 440. The front surface 420 of the mobile handset 410 includes a first camera 430A and a second camera 430B. The first camera 430A and the second camera 430B may be examples of the sensor(s) 210 and/or the sensor(s) 220 of the imaging system 200. The first camera 430A and the second camera 430B can be directed at the portion(s) of user, including the eye(s) of the user, the mouth of the user, the nose of the user, the face of the user, and/or the body of the user, while content (e.g., the rendered image 255) is displayed on the display 440. The display 440 may be an example of the display(s) of the output device(s) 260 of the imaging system 200.

The first camera 430A and the second camera 430B are illustrated in a bezel around the display 440 on the front surface 420 of the mobile handset 410. In some examples, the first camera 430A and the second camera 430B can be positioned in a notch or cutout that is cut out from the display 440 on the front surface 420 of the mobile handset 410. In some examples, the first camera 430A and the second camera 430B can be under-display cameras that are positioned between the display 440 and the rest of the mobile handset 410, so that light passes through a portion of the display 440 before reaching the first camera 430A and the second camera 430B. The first camera 430A and the second camera 430B of the perspective diagram 400 are front-facing cameras. The first camera 430A and the second camera 430B face a direction perpendicular to a planar surface of the front surface 420 of the mobile handset 410. The first camera 430A and the second camera 430B may be two of the one or more cameras of the mobile handset 410. In some examples, the front surface 420 of the mobile handset 410 may only have a single camera.

In some examples, the display 440 of the mobile handset 410 displays one or more output images toward the user using the mobile handset 410. In some examples, the output images can include the rendered image 255. The output images can be based on the images (e.g., the image 205 and/or the image 275) captured by the first camera 430A, the second camera 430B, the third camera 430C, and/or the fourth camera 430D, for example with the virtual content (e.g., the rendered image 255) overlaid.

In some examples, the front surface 420 of the mobile handset 410 may include one or more additional cameras in addition to the first camera 430A and the second camera 430B. The one or more additional cameras may also be examples of the sensor(s) 210 and/or the sensor(s) 220 of the imaging system 200. In some examples, the front surface 420 of the mobile handset 410 may include one or more additional sensors in addition to the first camera 430A and the second camera 430B. The one or more additional sensors may also be examples of the sensor(s) 210 and/or the sensor(s) 220 of the imaging system 200. In some cases, the front surface 420 of the mobile handset 410 includes more than one display 440. The one or more displays 440 of the front surface 420 of the mobile handset 410 can be examples of the display(s) of the output device(s) 260 of the imaging system 200. For example, the one or more displays 440 can include one or more touchscreen displays.

The mobile handset 410 may include one or more speakers 435A and/or other audio output devices (e.g., earphones or headphones or connectors thereto), which can output audio to one or more ears of a user of the mobile handset 410. One speaker 435A is illustrated in FIG. 4A, but it should be understood that the mobile handset 410 can include more than one speaker and/or other audio device. In some examples, the mobile handset 410 can also include one or more microphones (not pictured). The one or more microphones can be examples of the sensor(s) 210 and/or the sensor(s) 220 of the imaging system 200. In some examples, the mobile handset 410 can include one or more microphones along and/or adjacent to the front surface 420 of the mobile handset 410, with these microphones being examples of the sensor(s) 210 and/or the sensor(s) 220 of the imaging system 200. In some examples, the audio output by the mobile handset 410 to the user through the one or more speakers 435A and/or other audio output devices may include, or be based on, audio recorded using the one or more microphones.

Figure 4B:
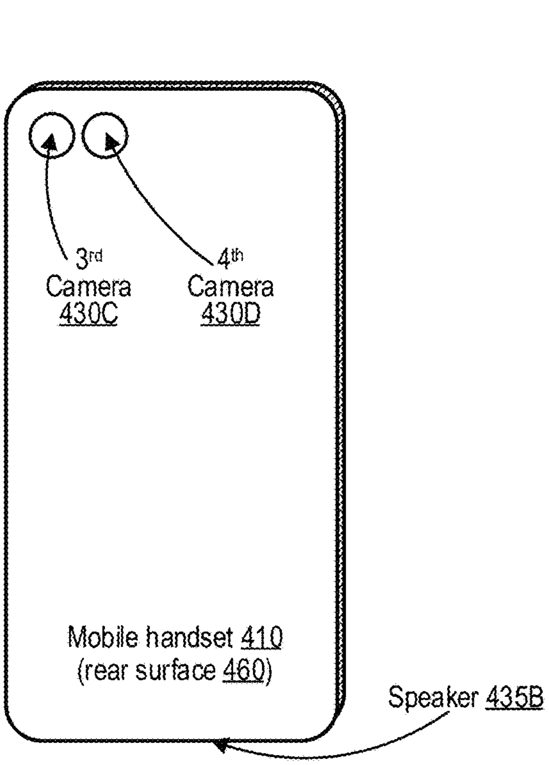
FIG. 4B is a perspective diagram illustrating a rear surface of a mobile handset that includes rear-facing cameras and that can be used as part of an imaging system, in accordance with some examples.

FIG. 4B is a perspective diagram 450 illustrating a rear surface 460 of a mobile handset that includes rear-facing cameras and that can be used as part of an imaging system 200. The mobile handset 410 includes a third camera 430C and a fourth camera 430D on the rear surface 460 of the mobile handset 410. The third camera 430C and the fourth camera 430D of the perspective diagram 450 are rear-facing. The third camera 430C and the fourth camera 430D may be examples of the sensor(s) 210 and/or the sensor(s) 220 of the imaging system 200 of FIG. 2. The third camera 430C and the fourth camera 430D face a direction perpendicular to a planar surface of the rear surface 460 of the mobile handset 410.

The third camera 430C and the fourth camera 430D may be two of the one or more cameras of the mobile handset 410. In some examples, the rear surface 460 of the mobile handset 410 may only have a single camera. In some examples, the rear surface 460 of the mobile handset 410 may include one or more additional cameras in addition to the third camera 430C and the fourth camera 430D. The one or more additional cameras may also be examples of the sensor(s) 210 and/or the sensor(s) 220 of the imaging system 200. In some examples, the rear surface 460 of the mobile handset 410 may include one or more additional sensors in addition to the third camera 430C and the fourth camera 430D. The one or more additional sensors may also be examples of the sensor(s) 210 and/or the sensor(s) 220 of the imaging system 200. In some examples, the first camera 430A, the second camera 430B, third camera 430C, and/or the fourth camera 430D may be examples of the image capture and processing system 100, the image capture device 105A, the image processing device 105B, or a combination thereof.

The mobile handset 410 may include one or more speakers 435B and/or other audio output devices (e.g., earphones or headphones or connectors thereto), which can output audio to one or more ears of a user of the mobile handset 410. One speaker 435B is illustrated in FIG. 4B, but it should be understood that the mobile handset 410 can include more than one speaker and/or other audio device. In some examples, the mobile handset 410 can also include one or more microphones (not pictured). The one or more microphones can be examples of the sensor(s) 210 and/or the sensor(s) 220 of the imaging system 200. In some examples, the mobile handset 410 can include one or more microphones along and/or adjacent to the rear surface 460 of the mobile handset 410, with these microphones being examples of the sensor(s) 210 and/or the sensor(s) 220 of the imaging system 200. In some examples, the audio output by the mobile handset 410 to the user through the one or more speakers 435B and/or other audio output devices may include, or be based on, audio recorded using the one or more microphones.

The mobile handset 410 may use the display 440 on the front surface 420 as a pass-through display. For instance, the display 440 may display output images, such as the rendered image 255. The output images can be based on the images (e.g. the image 205 and/or the image 275) captured by the third camera 430C and/or the fourth camera 430D, for example with the virtual content (e.g., the rendered image 255) overlaid. The first camera 430A and/or the second camera 430B can capture images of the user's eyes (and/or other portions of the user) before, during, and/or after the display of the output images with the virtual content on the display 440. This way, the sensor data from the first camera 430A and/or the second camera 430B can capture reactions to the virtual content by the user's eyes (and/or other portions of the user).

In some examples, at least a subset of the cameras 430A-430D of the mobile handset 410 can capture image data in the first EM frequency domain 215 (e.g., IR and/or NIR). In some examples, at least a subset of the cameras 430A-430D of the mobile handset 410 can capture image data in the second EM frequency domain 225 (e.g., visible light). In some examples, the mobile handset 410 can include one or more light sources (e.g., as part of the display 440, near the cameras 430A-430B, near the cameras 430C-430D, or otherwise). In some examples, at least a subset of the light source(s) can provide light and/or illumination in the first EM frequency domain 215 (e.g., IR and/or NIR). In some examples, at least a subset of the light source(s) can provide light and/or illumination in the second EM frequency domain 225 (e.g., visible light). One benefit to having the light source(s) provide light and/or illumination in the IR and/or NIR domain is that the light source(s) can provide light and/or illumination in the IR and/or NIR domain onto the user's eyes without the user's eyes seeing the IR and/or NIR light. If at least a subset of the cameras 430A-430E of the mobile handset 410 operate in the IR and/or NTR domain, then, these cameras can image the face of the user with IR and/or NIR illumination without disrupting the user 320's viewing experience of the display(s) 440, since the illumination from the light source(s) remains invisible or dim in the visible light domain. In some examples, the cameras 430A-430D of the mobile handset 410 can capture images similar to the images 360A-360C of FIG. 3C, for instance based on the illumination from the light source(s) of the mobile handset 410.

Figure 5:
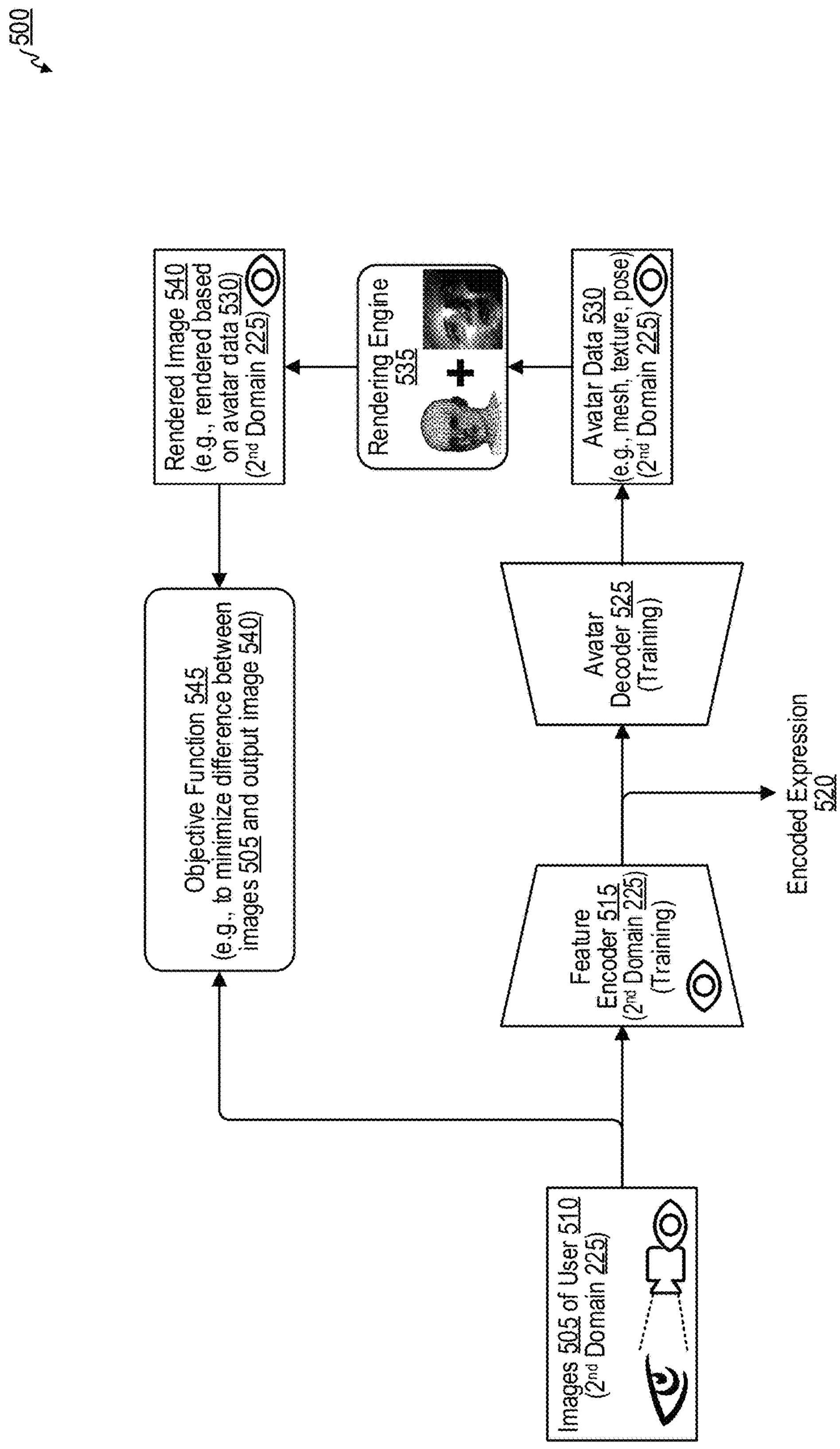
FIG. 5 is a block diagram illustrating training of a feature encoder and an avatar decoder in an imaging system, in accordance with some examples.

FIG. 5 is a block diagram illustrating training of a feature encoder 515 and an avatar decoder 525 in an imaging system 500. Images 505 of a user 510 are captured in the second EM frequency domain 225 (e.g., visible light), by one or more image sensors (e.g., of one or more cameras). The images 505 may be captured, for example, by the image capture and processing system 100, the sensor(s) 210, the sensor(s) 220, the camera(s) 330A-330G, the camera(s) 430A-430D, or a combination thereof.

In some examples, the images 505 may include unobstructed views of the user 510 with varying expressions taken from different viewpoints and/or perspectives. In some examples, the images 505 may be images of the full face of the user 510, as illustrated for the image(s) 1150. The feature encoder 515 may be trained to receive the images 505 in the second EM frequency domain 225 and extract an encoded expression 520 (e.g., facial expression, head pose, body pose, and/or other pose information) from the images 505. The avatar decoder 525 may be trained to generate avatar data 530. The feature encoder 515 and avatar decoder 525, together, are trained to receive the images 505, extract the encoded expression 520 from the images 505, and generate avatar data 530 having the expression indicated by the encoded expression 520. The avatar data 530 may include mesh (e.g., as in mesh 240), texture (e.g., as in texture 245), pose (e.g., position of the user 510, orientation of the user 510, facial expressions by the user 510, head pose of the user 510, body pose of the user 510, gestures of the user 510, hair details, or combinations thereof), or combinations thereof. The texture in the avatar data 530 may be in the second EM frequency domain 225 (e.g., visible light). A rendering engine 535, like the rendering engine 250, may combine the mesh, texture, and pose information in the avatar data 530 into an avatar of the user 510, and generate a rendered image 540 in the second EM frequency domain 225 (e.g., visible light). The rendering engine 535 may be an example of the rendering engine 250, or vice versa. The rendered image 255 may be an example of the rendered image 540.

The feature encoder 515, avatar decoder 525, and/or rendering engine 535 may be examples of ML model(s) 235 that are trained and/or used by the ML engine 230. The imaging system 500 may include an objective function 545 for use in training the feature encoder 515 and avatar decoder 525. In some examples, during training, the feature encoder 515, avatar decoder 525, and rendering engine 535 may be directed to generate the rendered image 540 to attempt to reconstruct at least one of the images 505. The objective function 545 may compute a loss, or a difference between the images 505 and the rendered image 540. The objective function 545 may direct the training (e.g., of the feature encoder 515, avatar decoder 525, and/or rendering engine 535) to minimize the difference between the images 505 and the rendered image 540 (e.g., to minimize the loss). In some examples, the objective function 545 is a least absolute deviations (LAD) loss function, also known as an L1 loss function. In some examples, the objective function 545 is a least square errors (LSE) loss function, also known as an L2 loss function.

In some examples, during training, the images 505 of the user 510 are captured using a specialized multi-sensor capture environment (e.g., a light cage) with light source(s) providing illumination in the first EM frequency domain 215, sensor(s) capturing images in the first EM frequency domain 215, light source(s) providing illumination in the second EM frequency domain 225, sensor(s) capturing images in the second EM frequency domain 225, or a combination thereof.

Figure 6:
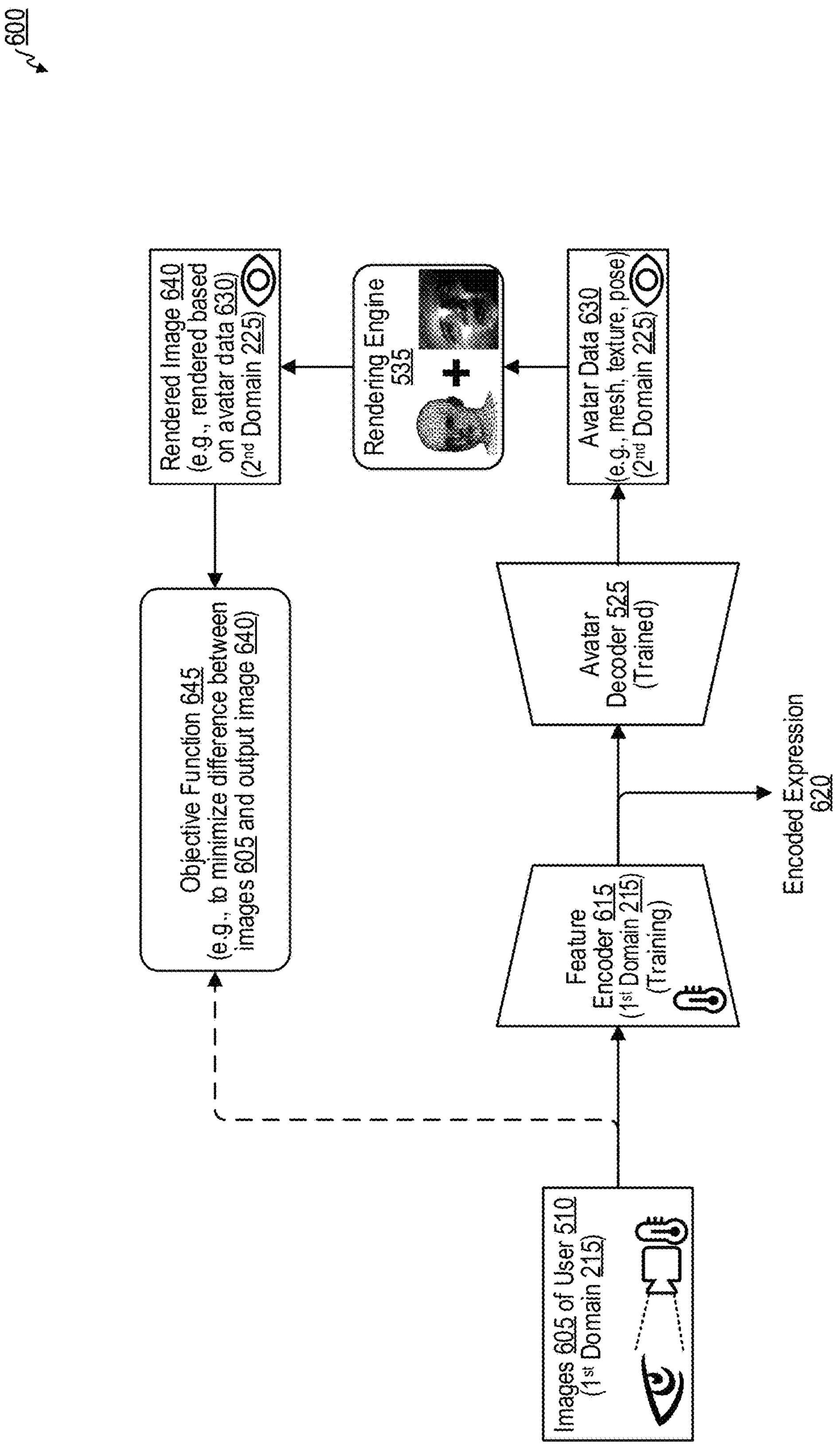
FIG. 6 is a block diagram illustrating training of a feature encoder in an imaging system, in accordance with some examples.

FIG. 6 is a block diagram illustrating training of a feature encoder 615 in an imaging system 600. Images 605 of the user 510 are captured in the first EM frequency domain 215 (e.g., IR and/or NIR), by one or more image sensors (e.g., of one or more cameras). The images 605 may be captured, for example, by the image capture and processing system 100, the sensor(s) 210, the sensor(s) 220, the camera(s) 330A-330G, the camera(s) 430A-430D, or a combination thereof.

In some examples, the images 605 may include views of portions of the user 510's face (e.g., one or both eyes of the user, the mouth of the user, the nose of the user, the cheeks of the user, the eyebrows of the user, the chin of the user, the jaw of the user, one or both ears of the user, the forehead of the user, the hair of the user, at least a subset of the face of the user, at least a subset of the head of the user, at least a subset of the upper body of the user, at least a subset of the torso of the user, one or both arms of the user, one or both shoulders of the user, one or both hands of the user, another portion of the user, one or both legs of the user, one or both feet of the user, or a combination thereof). Examples of the images 605 include the images 360A-360C, the image(s) 805, the image(s) 860, the image(s) 905, the image(s) 920, the image(s) 945, the image(s) 1005, the image(s) 1020, the image(s) 1045, the rendered image(s) 1160, the image(s) 1105, the image(s) 1120, the image(s) 1145, the pairs of images 1220, the pairs of images 1225, or combinations thereof.

The avatar decoder 525, as used in the imaging system 600 of FIG. 6, may already be trained using the training of the imaging system 500 of FIG. 5, to generate avatar data (e.g., avatar data 530, avatar data 630). The feature encoder 615 may be trained to receive the images 605 in the first EM frequency domain 215 and extract an encoded expression 620 (e.g., facial expression, head pose, body pose, and/or other pose information) from the images 605. The feature encoder 615 and avatar decoder 525, together, are trained to receive the images 605, extract the encoded expression 620 from the images 605, and generate avatar data 630 having the expression indicated by the encoded expression 620. The avatar data 630 may include mesh (e.g., as in mesh 240), texture (e.g., as in texture 245), pose (e.g., position of the user 510, orientation of the user 510, facial expressions by the user 510, head pose of the user 510, body pose of the user 510, gestures of the user 510, hair details, or combinations thereof), or combinations thereof. The texture in the avatar data 630 may be in the second EM frequency domain 225 (e.g., visible light). The rendering engine 535 may combine the mesh, texture, and pose information in the avatar data 630 into an avatar of the user 510, and generate a rendered image 640 in the second EM frequency domain 225 (e.g., visible light). The rendered image 255 may be an example of the rendered image 640.

The feature encoder 615, avatar decoder 525, and/or rendering engine 535 may be examples of ML model(s) 235 that are trained and/or used by the ML engine 230. The imaging system 600 may include an objective function 645 for use in training the feature encoder 615. In some examples, during training, the feature encoder 615, avatar decoder 525, and rendering engine 535 may be directed to generate the rendered image 640 to attempt to reconstruct at least one of the images 605. The objective function 645 may compute a loss, or a difference between the images 605 and the rendered image 640. The objective function 645 may direct the training (e.g., of the feature encoder 615, avatar decoder 625, and/or rendering engine 635) to minimize the difference between the images 605 and the rendered image 640 (e.g., to minimize the loss). In some examples, the objective function 645 is a LAD loss function, also known as an L1 loss function. In some examples, the objective function 645 is a LSE loss function, also known as an L2 loss function. In some examples, during training, the images 605 of the user 510 are captured using the specialized multi-sensor capture environment described above.

Figure 7:
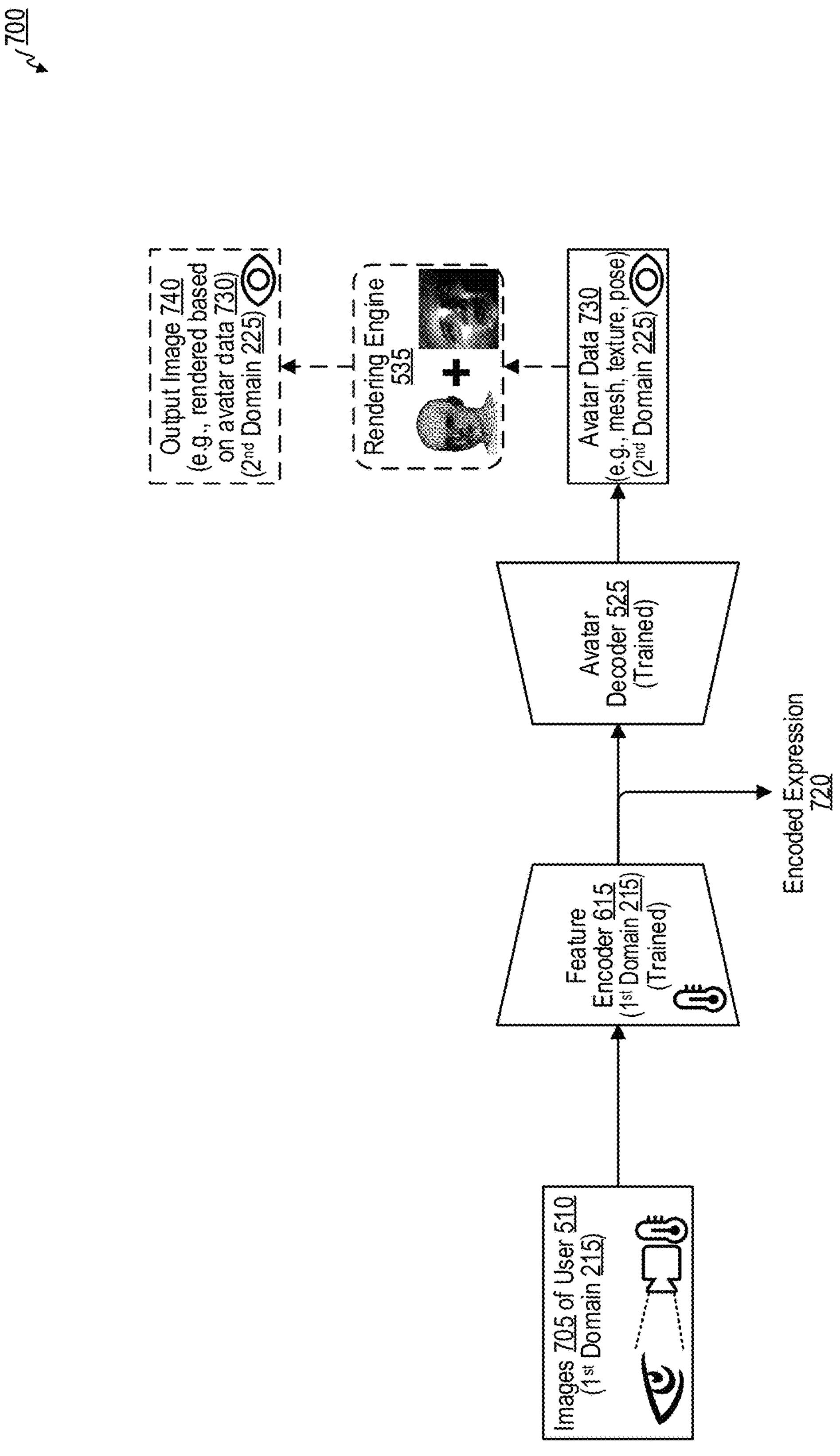
FIG. 7 is a block diagram illustrating use of a feature encoder and an avatar decoder in an imaging system after training, in accordance with some examples.

FIG. 7 is a block diagram illustrating use of a feature encoder 615 and an avatar decoder 525 in an imaging system 700 after training. Images 705 of the user 510 are captured in the first EM frequency domain 215 (e.g., IR and/or NIR), by one or more image sensors (e.g., of one or more cameras), similarly to the images 605. The images 705 may be captured, for example, by the image capture and processing system 100, the sensor(s) 210, the sensor(s) 220, the camera(s) 330A-330G, the camera(s) 430A-430D, or a combination thereof. In some examples, the images 705 may include views of portions of the user 510's face, similarly to the images 605. Examples of the images 705 any of the examples of the images 605 listed above.

The avatar decoder 525 and the feature encoder 615 are already trained according to the descriptions above with respect to the imaging system 500 of FIG. 5 and the imaging system 600 of FIG. 6, respectively. Thus, no additional training is needed to use the avatar decoder 525 and the feature encoder 615. The feature encoder 615 receives the images 705 in the first EM frequency domain 215 and extracts an encoded expression 720 (e.g., facial expression, head pose, body pose, and/or other pose information) from the images 705. The feature encoder 615 and avatar decoder 525, together, receive the images 705, extract the encoded expression 720 from the images 705, and generate avatar data 730 having the expression indicated by the encoded expression 720. The avatar data 730 may include mesh (e.g., as in mesh 240), texture (e.g., as in texture 245), pose (e.g., position of the user 510, orientation of the user 510, facial expressions by the user 510, head pose of the user 510, body pose of the user 510, gestures of the user 510, hair details, or combinations thereof), or combinations thereof. The texture in the avatar data 730 may be in the second EM frequency domain 225 (e.g., visible light). The rendering engine 535 may combine the mesh, texture, and pose information in the avatar data 730 into an avatar of the user 510, and generate a rendered image 740 in the second EM frequency domain 225 (e.g., visible light). The rendered image 255 may be an example of the rendered image 740.

In some examples, the images 705 of the user 510 are captured using the specialized multi-sensor capture environment described above. In some examples, the images 705 of the user 510 are captured using other types of cameras, such as any of the cameras 330A-330G of the HMD 310 or any of the cameras 430A-430D of the mobile handset 410.

Figure 8:
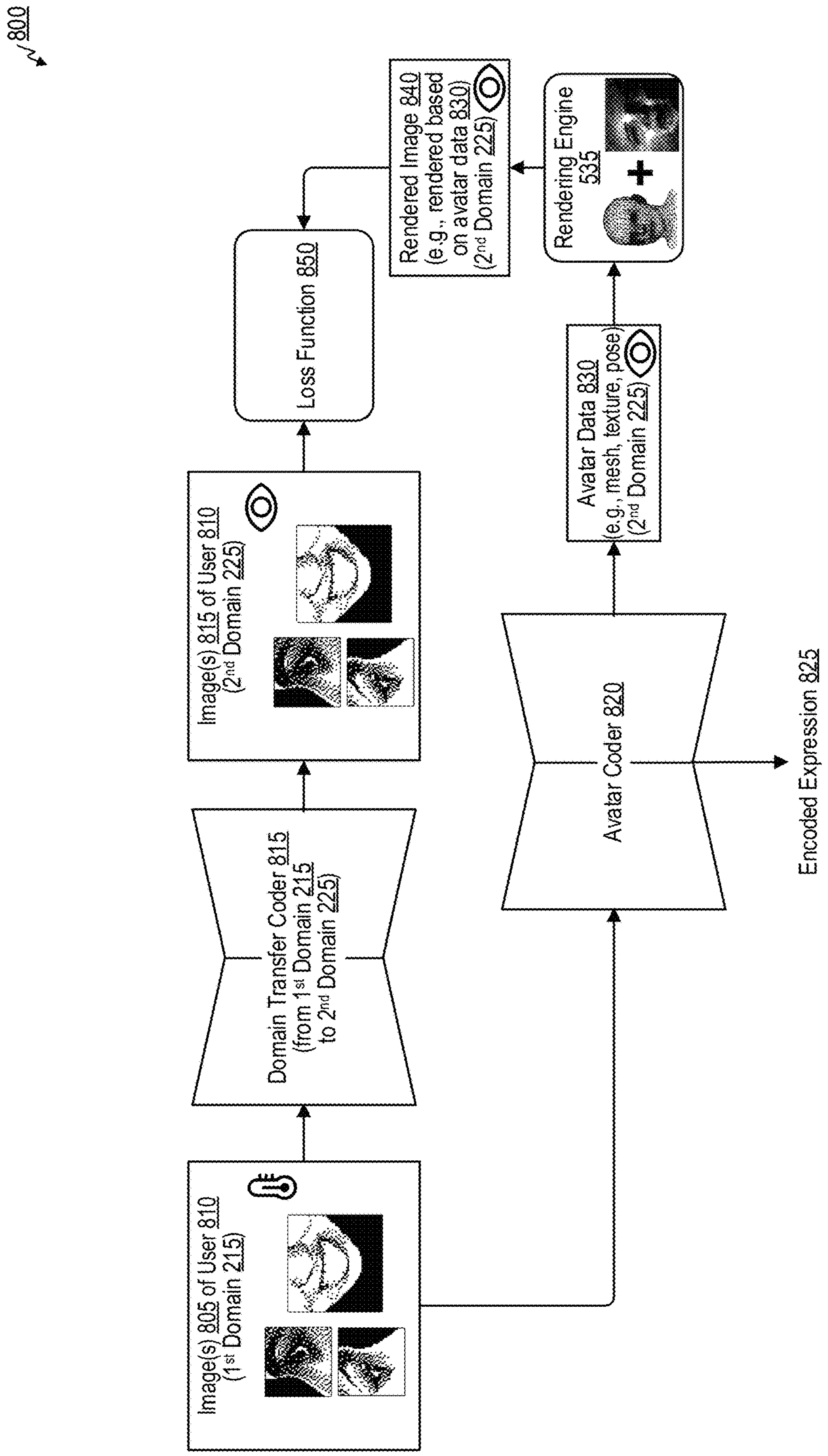
FIG. 8 is a block diagram illustrating use of a domain transfer coder with a loss function for an avatar coder in an imaging system, in accordance with some examples.

FIG. 8 is a block diagram illustrating use of a domain transfer coder 815 with a loss function 850 for an avatar coder 820 in an imaging system 800. Images 805 of the user 810 are captured in the first EM frequency domain 215 (e.g., IR and/or NIR), by one or more image sensors (e.g., of one or more cameras), similarly to the images 605 and/or the images 705. The images 805 may be captured, for example, by the image capture and processing system 100, the sensor(s) 210, the sensor(s) 220, the camera(s) 330A-330G, the camera(s) 430A-430D, or a combination thereof. In some examples, the images 805 may include views of portions of the user 810's face, similarly to the images 605 and/or the images 705. Examples of the images 805 any of the examples of the images 605 and/or the images 705 listed above.

The avatar coder 820 may include the feature encoder 615 and the avatar decoder 525 as discussed above with respect to the imaging system 500 of FIG. 5, the imaging system 600 of FIG. 6, and the imaging system 700 of FIG. 7. The feature encoder 615 of the avatar coder 820 receives the images 705 in the first EM frequency domain 215 and is trained to extract an encoded expression 825 (e.g., facial expression, head pose, body pose, and/or other pose information) from the images 705. The avatar coder 820 is trained to receive the images 705, extract the encoded expression 825 from the images 705, and generate avatar data 830 having the expression indicated by the encoded expression 825. The avatar data 830 may include mesh (e.g., as in mesh 240), texture (e.g., as in texture 245), pose (e.g., position of the user 510, orientation of the user 510, facial expressions by the user 510, head pose of the user 510, body pose of the user 510, gestures of the user 510, hair details, or combinations thereof), or combinations thereof. The texture in the avatar data 830 may be in the second EM frequency domain 225 (e.g., visible light). The rendering engine 535 may combine the mesh, texture, and pose information in the avatar data 830 into an avatar of the user 510, and generate a rendered image 840 in the second EM frequency domain 225 (e.g., visible light). The rendered image 255 may be an example of the rendered image 840.

A domain transfer coder 815 may be trained to convert the images 805 of the user 810 from the first EM frequency domain 215 (e.g., IR and/or NIR) into images 860 of the user 810 in the second EM frequency domain 225 (e.g., visible light). The domain transfer coder 815 may, for example, include the third set of ML model(s) 1125, such as the feature encoder 1130, the feature encoder 1135, the image decoder 1140, or a combination thereof. In some examples, the domain transfer coder 815 is trained to convert the images 805 from the IR and/or NIR domain into the images 860 the visible light domain. A conversion from the IR and/or NIR domain to the visible light domain can be particularly challenging, for instance because images in the IR and/or NIR domain are generally represented in greyscale (with different shades of grey representing different IR and/or NIR frequencies), while images in the visible light domain are generally represented in color (e.g., with red, green, and/or blue color channels). Thus, it may be challenging to know what colors to use for different parts of a user's body (e.g., skin color, eye (iris) color, hair color) and different objects that the user is wearing (e.g., clothing color and/or color of accessories such as glasses or jewelry) in a conversion from the IR and/or NR domain to the visible light domain. To account for these challenges, in some examples, the domain transfer coder 815 may be trained using training data generated by other ML model(s) (e.g., the ML model(s) 1025 and/or the ML model(s) 925) that convert from the visible light domain to the IR and/or NIR domain. Further, in some examples, the domain transfer coder 815 may be specially trained to be customized and/or personalized for a single user (e.g., user 810), so that the domain transfer coder 815 is trained to use the correct colors for different parts of a user's body and/or for different objects that the user is wearing. Training of the third set of ML model(s) 1125, and therefore the domain transfer coder 815, is illustrated and described further below with respect to the imaging system 1100 of FIG. 11, with further context in FIGS. 9, 10, and 12.

The avatar coder 820 and/or the domain transfer coder 815 may be examples of ML model(s) 235 that are trained and/or used by the ML engine 230. The imaging system 800 may include a loss function 850 for use in training the avatar coder 820 and/or the domain transfer coder 815. In some examples, during training, the avatar coder 820 may be directed to generate the rendered image 840 to attempt to reconstruct at least one of the images 805. The loss function 850 may compute a loss, or a difference between the images 805 and the rendered image 840. The loss function 850 may direct the training (e.g., of the avatar coder 820 and/or the domain transfer coder 815) to minimize the difference between the images 805 and the rendered image 840 (e.g., to minimize the loss). In some examples, the loss function 850 is a LAD loss function, also known as an L1 loss function. In some examples, the loss function 850 is a LSE loss function, also known as an L2 loss function. In some examples, during training, the images 805 of the user 510 are captured using the specialized multi-sensor capture environment described above. In some examples, the images 805 of the user 810 are captured using other types of cameras, such as any of the cameras 330A-330G of the HMD 310 or any of the cameras 430A-430D of the mobile handset 410.

Figure 9:
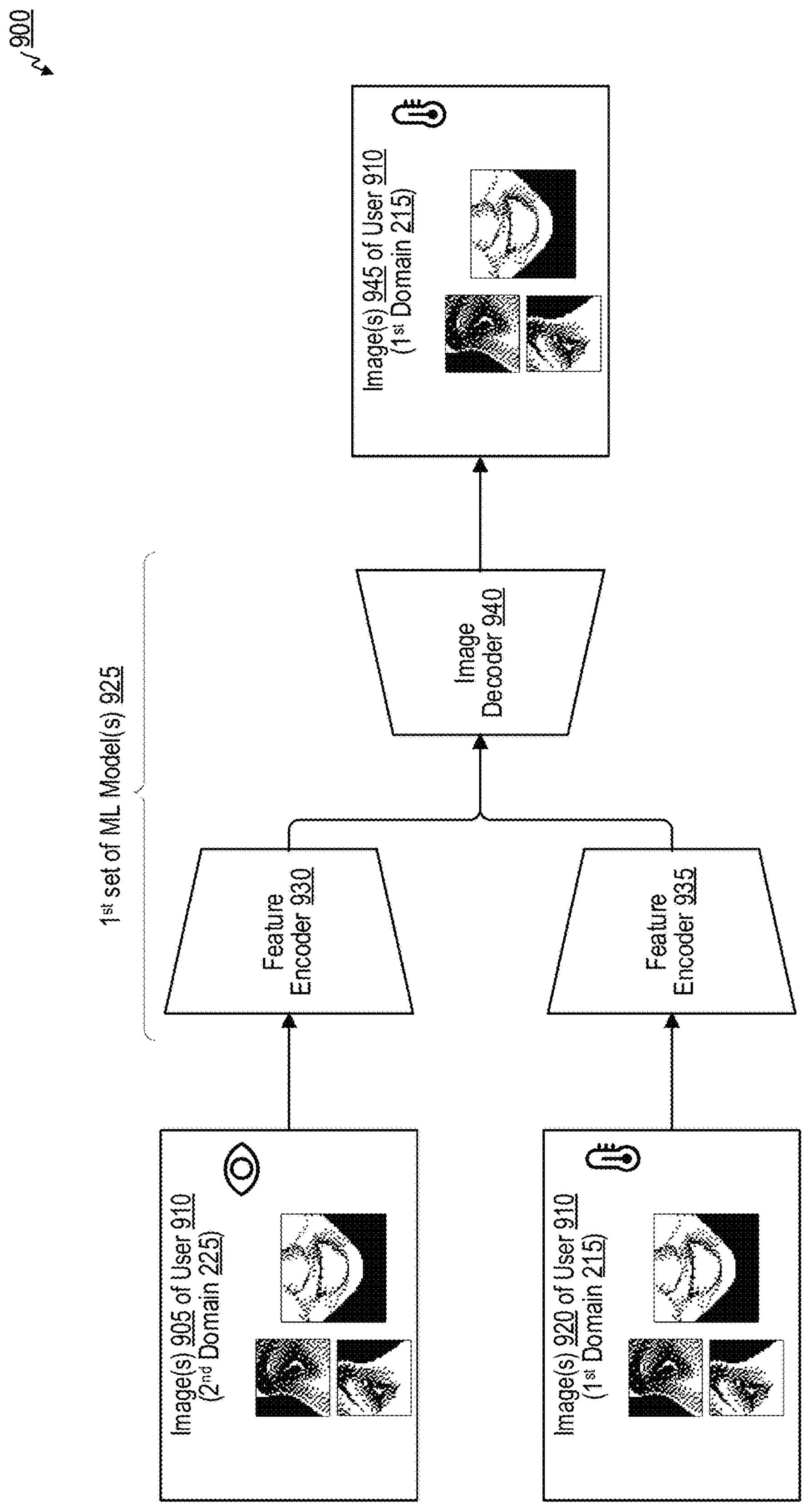
FIG. 9 is a block diagram illustrating an imaging system for training and/or use of a first set of one or more machine learning (ML) models for domain transfer from the second electromagnetic (EM) frequency domain to the first EM frequency domain, in accordance with some examples.

FIG. 9 is a block diagram illustrating an imaging system 900 for training and/or use of a first set of one or more machine learning (ML) models 925 for domain transfer from the second electromagnetic (EM) frequency domain 225 to the first EM frequency domain 215. In some examples, the first set of ML model(s) 925 receives image(s) 905 of a user 910 in the second EM frequency domain 225 (e.g., visible light domain) and image(s) 920 of the user 910 in the first EM frequency domain 215 (e.g., IR and/or NIR domain). In some examples, the image(s) 905 are captured using the sensor(s) 220. In some examples, the image(s) 920 are captured using the sensor(s) 210. In some examples, during training, the image(s) 905 and the image(s) 920 of the user 910 are captured using a specialized multi-sensor capture environment with light source(s) providing illumination in the first EM frequency domain 215, sensor(s) capturing images in the first EM frequency domain 215, light source(s) providing illumination in the second EM frequency domain 225, sensor(s) capturing images in the second EM frequency domain 225, or a combination thereof. In some examples, at least some of the sensor(s) capturing the image(s) 920 in the first EM frequency domain 215 may be located on an HMD 310, for instance along the interior of the HMD 310, such as any of the cameras 330A-330F of the HMD 310. In some examples, at least some of the sensor(s) capturing the image(s) 905 in the second EM frequency domain 225 may be located on an HMD 310, for instance along the interior of the HMD 310, such as any of the cameras 330A-330F of the HMD 310.

In some examples, the first set of ML model(s) 925 includes a feature encoder 930 that is trained to encode features of the image(s) 905. In some examples, the first set of ML model(s) 925 includes a feature encoder 935 that is trained to encode features of the image(s) 920. In some examples, the first set of ML model(s) 925 includes an image decoder 940 that is trained to generate image(s) 945 of the user 910 in the first EM frequency domain 215 (e.g., IR and/or NIR domain) based on the features extracted and/or encoded by the feature encoder 930 and/or the feature encoder 935. In some examples, the first set of ML model(s) 925 are trained by the imaging system 900 to generate image(s) (e.g., such as the image(s) 945) of the user 910 in the first EM frequency domain 215 (e.g., IR and/or NIR domain) from image(s) (e.g., such as the image(s) 905) of the user 910 in the second EM frequency domain 225 (e.g., visible light domain), with the input image(s) 920 in the first EM frequency domain 215 (e.g., IR and/or NIR domain) used only during training.

In some examples, the first set of ML model(s) 925 is generalized and person-independent (e.g., can be used to convert any image of any person from the second EM frequency domain 225 to the first EM frequency domain 215). In some examples, the first set of ML model(s) 925 is person-specific (e.g., personalized to convert an image of a specified person depicted in the training data from the second EM frequency domain 225 to the first EM frequency domain 215). In some examples, the first set of ML model(s) 925 includes a cycle GAN with additional cross-view cycle consistency loss. In some examples, the first set of ML model(s) 925 includes any of the types of ML models described with respect to the ML model(s) 235.

Figure 10:
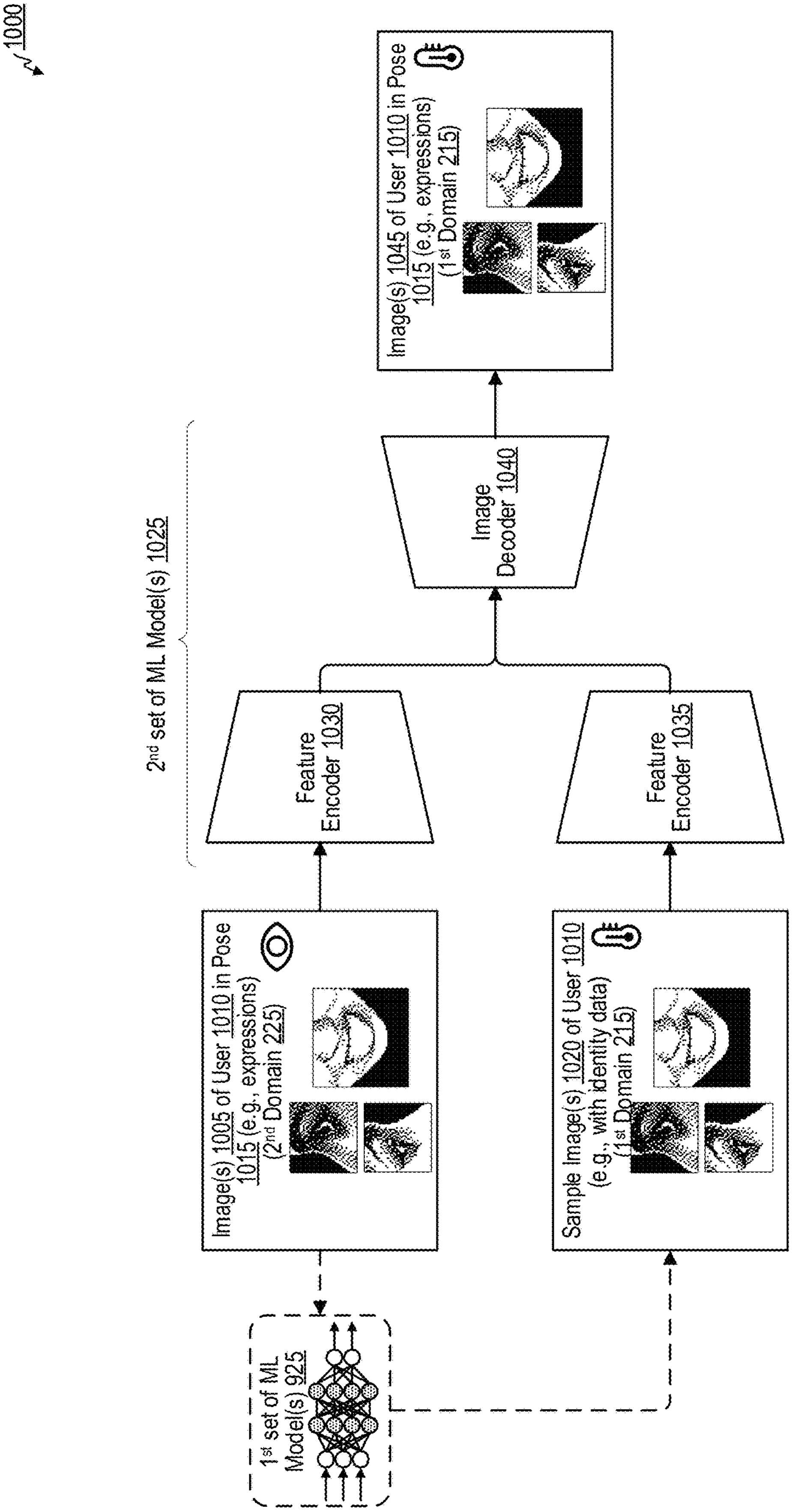
FIG. 10 is a block diagram illustrating an imaging system for training and/or use of a second set of one or more machine learning (ML) models for domain transfer from the second electromagnetic (EM) frequency domain to the first EM frequency domain, in accordance with some examples.

FIG. 10 is a block diagram illustrating an imaging system 1000 for training and/or use of a second set of one or more machine learning (ML) models for domain transfer from the second electromagnetic (EM) frequency domain 225 to the first EM frequency domain 215. In some examples, the second set of ML model(s) 1025 receives image(s) 1005 of a user 1010 in the second EM frequency domain 225 (e.g., visible light domain) and image(s) 1020 of the user 1010 in the first EM frequency domain 215 (e.g., IR and/or NIR domain). In some examples, the image(s) 1005 are captured using the sensor(s) 220. In some examples, the image(s) 1020 are captured using the sensor(s) 210.

In some examples, the image(s) 1005 and/or the image(s) 1020 are generated using the first set of ML model(s) 925. For instance, the image(s) 1005 may be captured using sensor(s) 220, while the image(s) 1020 are generated by the first set of ML model(s) 925 based on input of the image(s) 1005 into the first set of ML model(s) 925. In some examples, both the image(s) 1005 and the image(s) 1020 are provided to the second set of ML model(s) 1025 from the first set of ML model(s) 925.

In some examples, the second set of ML model(s) 1025 includes a feature encoder 1030 that is trained to encode features of the image(s) 1005. In some examples, the second set of ML model(s) 1025 includes a feature encoder 1035 that is trained to encode features of the image(s) 1020. In some examples, the second set of ML model(s) 1025 includes an image decoder 1040 that is trained to generate image(s) 1045 of the user 1010 in the first EM frequency domain 215 (e.g., IR and/or NIR domain) based on the features extracted and/or encoded by the feature encoder 1030 and/or the feature encoder 1035. In some examples, the second set of ML model(s) 1025 are trained by the imaging system 1000 to generate image(s) (e.g., such as the image(s) 1045) of the user 1010 in the first EM frequency domain 215 (e.g., IR and/or NIR domain) from image(s) (e.g., such as the image(s) 1005) of the user 1010 in the second EM frequency domain 225 (e.g., visible light domain), with the input image(s) 1020 in the first EM frequency domain 215 (e.g., IR and/or NR domain) used only during training. In some examples, the input image(s) 1020 in the first EM frequency domain 215 (e.g., IR and/or NIR domain) include identity information that is helpful for training the second set of ML model(s) 1025 to create realistic textures (e.g., skin textures, etc.) for particular users (e.g., user 1010) in the output image(s) (e.g., the image 1045) that the second set of ML model(s) 1025 generates in the first EM frequency domain 215 (e.g., IR and/or NIR domain).

In some examples, the second set of ML model(s) 1025 is generalized and person-independent (e.g., can be used to convert any image of any person from the second EM frequency domain 225 to the first EM frequency domain 215). In some examples, the second set of ML model(s) 1025 is person-specific (e.g., personalized to convert an image of a specified person depicted in the training data from the second EM frequency domain 225 to the first EM frequency domain 215). In an illustrative example, the first set of ML model(s) 925 is person-specific, while the second set of ML model(s) 1025 is generalized and person-independent. In another illustrative example, the first set of ML model(s) 925 is generalized and person-independent, while the second set of ML model(s) 1025 is person-specific. In some examples, the second set of ML model(s) 1025 is trained using supervised learning, such as teacher-student learning. In some examples, the imaging system 1000 trains the second set of ML model(s) 1025 using identity adversarial loss, for instance based on a set of non-corresponding identity-specific images in the first EM frequency domain 215 (e.g., IR and/or NIR domain) (e.g., captured using cameras 330A-330F of an HMD 310).

In some examples, after training is complete, the second set of ML model(s) 1025 can receive an image in the second EM frequency domain 225 (e.g., visible light domain) of a user having an arbitrary identity, and perform domain transfer to generate a corresponding image of the user in the first EM frequency domain 215 (e.g., IR and/or NIR domain).

Figure 11:
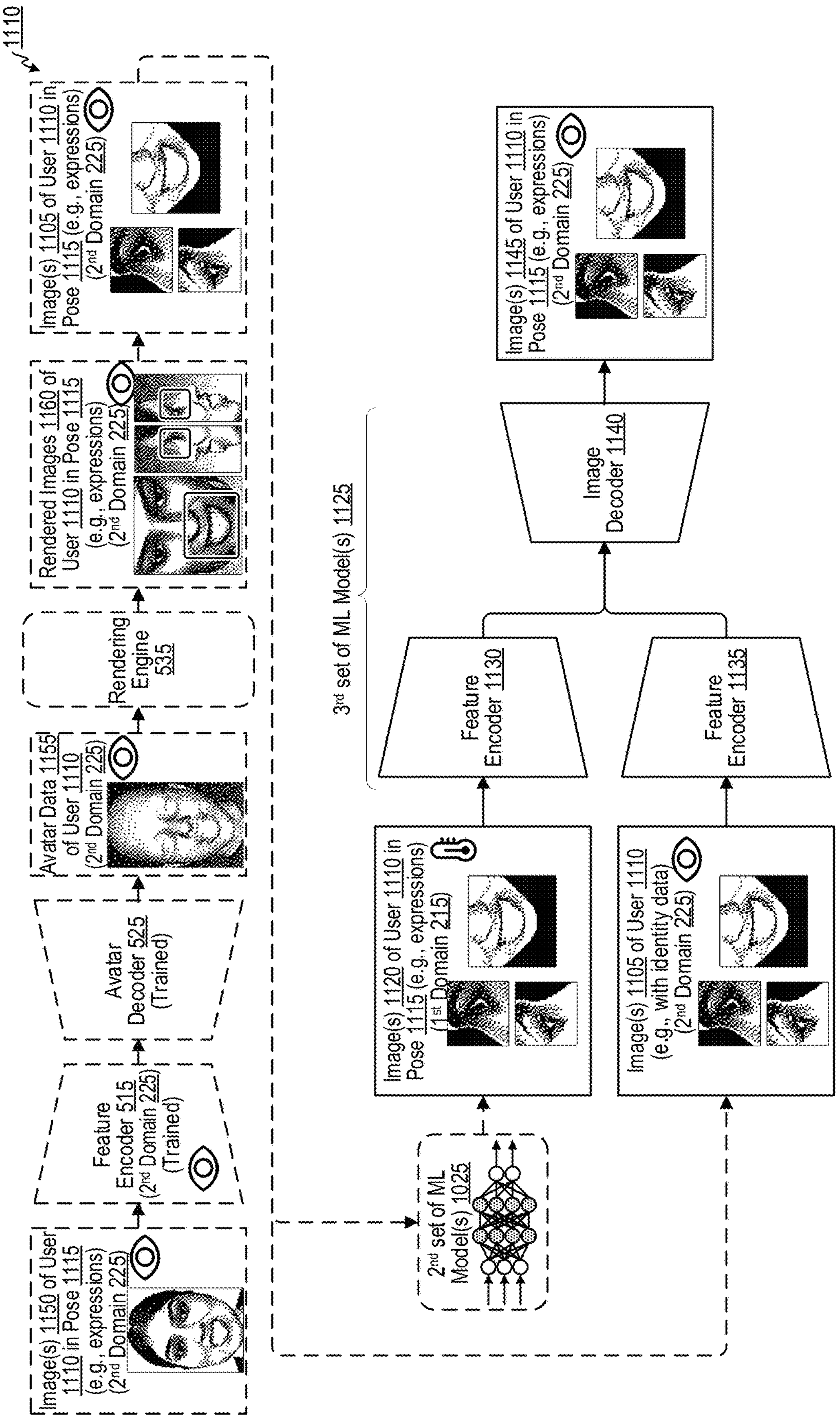
FIG. 11 is a block diagram illustrating an imaging system for training and/or use of a third set of one or more machine learning (ML) models for domain transfer from the first electromagnetic (EM) frequency domain to the second EM frequency domain, in accordance with some examples.

FIG. 11 is a block diagram illustrating an imaging system 1100 for training and/or use of a third set of one or more machine learning (ML) models for domain transfer from the first electromagnetic (EM) frequency domain 215 to the second EM frequency domain 225. In some examples, the third set of ML model(s) 1125 receives image(s) 1105 of a user 1110 in the second EM frequency domain 225 (e.g., visible light domain) and image(s) 1120 of the user 1110 in the first EM frequency domain 215 (e.g., IR and/or NIR domain). The user 1110 can have a particular pose 1115 (e.g., facial expression, head pose, body pose, and/or other pose information) in the image(s) 1120 and/or in the image(s) 1105. In some examples, the image(s) 1105 are captured using the sensor(s) 220. In some examples, the image(s) 1120 are captured using the sensor(s) 210.

In some examples, the image(s) 1105 and/or the image(s) 1120 are generated using the second set of ML model(s) 1025, the feature encoder 515, the avatar decoder 525, and/or the rendering engine 535. For instance, in some examples, image(s) 1150 of the user 1110 in the pose 1115 in the second EM frequency domain 225 (e.g., visible light domain) can be captured using sensor(s) 220. An example of the image(s) 1150 is illustrated. The feature encoder 515 and the avatar decoder 525 can receive the image(s) 1150 and generate avatar data 1155 of the user 1110 based on the image(s) 1150. The avatar data 1155 can include mesh (e.g., as in the mesh 240) and/or textures for the mesh (e.g., as in the texture 245). An example of a mesh without a texture applied and corresponding to the illustrated example of the image(s) 1150 is illustrated. The avatrar data 1155 is provided to the rendering engine 535, which generates an avatar by applying the texture to the mesh, and generates one or more rendered images 1150 of the user 1110 in the pose 1115. Examples of the rendered images 1150 are illustrated, and are captured from similar perspectives as would be captured using cameras of an HMD 310 (e.g., similar perspectives to images 360A-360C captured by third camera 330C, fourth camera 330D, and fifth camera 330E, respectively). Boxes are illustrated on the examples of the rendered images 1150 to illustrate areas of the rendered images 1150 that can be cropped out to further increase similarity to images captured using cameras of an HMD 310 (e.g., using the third camera 330C, fourth camera 330D, and fifth camera 330E, respectively). Using this cropping (or by only rendering the cropped area), the imaging system 1100 can obtain the image(s) 1105 of the user 1110 from the rendered images 1150. In some examples, the imaging system 1100 can pass the image(s) 1105 through the second set of ML model(s) 1025 to generate the image(s) 1120. In some examples, the imaging system 1100 can pass the image(s) 1105 through the first set of ML model(s) 925 to generate the image(s) 1120.

In some examples, the third set of ML model(s) 1125 includes a feature encoder 1130 that is trained to encode features of the image(s) 1105. In some examples, the third set of ML model(s) 1125 includes a feature encoder 1135 that is trained to encode features of the image(s) 1120. In some examples, the third set of ML model(s) 1125 includes an image decoder 1140 that is trained to generate image(s) 1145 of the user 1110 in the second EM frequency domain 225 (e.g., visible light domain) based on the features extracted and/or encoded by the feature encoder 1130 and/or the feature encoder 1135. In some examples, the third set of ML model(s) 1125 are trained by the imaging system 1100 to generate image(s) (e.g., such as the image(s) 1145) of the user 1110 in the second EM frequency domain 225 (e.g., visible light domain) from image(s) (e.g., such as the image(s) 1120) of the user 1110 in the first EM frequency domain 215 (e.g., IR and/or NIR domain), with the image(s) 1105 in the second EM frequency domain 225 (e.g., visible light domain), used only during training. In some examples, the image(s) 1105 in the second EM frequency domain 225 (e.g., visible light domain), include identity information that is helpful in creating realistic coloring (e.g., skin colors, eye (iris) colors, hair colors, clothing colors, jewelry colors, accessory colors, etc.) and/or realistic textures (e.g., skin textures, eye textures, iris textures, hair textures, clothing textures, etc.) for particular users (e.g., user 1110) in the output image(s) (e.g., the image 1145) that the third set of ML model(s) 1125 generates in the second EM frequency domain 225 (e.g., visible light domain). In some examples, an image in the second EM frequency domain 225 (e.g., visible light domain), such as the image(s) 1105, are also input into the third set of ML model(s) 1125 after the third set of ML model(s) 1125 are trained, to help provide identity information (e.g., coloring information and/or texture information for the user 1110) to be used to generate the output image (e.g., the image 1145) in the second EM frequency domain 225 (e.g., visible light domain).

In some examples, the third set of ML model(s) 1125 is generalized and person-independent (e.g., can be used to convert any image of any person from the first EM frequency domain 215 to the second EM frequency domain 225). In some examples, the third set of ML model(s) 1125 is person-specific (e.g., personalized to convert an image of a specified person depicted in the training data from the first EM frequency domain 215 to the second EM frequency domain 225). In some examples, the third set of ML model(s) 1125 is trained using supervised learning, such as teacher-student learning. In some examples, the imaging system 1100 trains the third set of ML model(s) 1125 using adversarial loss, for instance based on identity information (e.g., regarding coloring and/or textures of different part(s) of the user 1110).

Because the rendered images 1160 are used to similar perspectives of the cameras inside the HMD 310 (e.g., the cameras 330C-330F), once the imaging system 1100 finishes training the third set of ML model(s) 1125, images that are actually captured by cameras inside the HMD 310 (e.g., the cameras 330C-330F) can be input into the third set of ML model(s) 1125 in order to perform a domain transfer conversion of these images from the from the first EM frequency domain 215 to the second EM frequency domain 225. In some examples, the third set of ML model(s) 1125 can be specially and personally trained for each user 1110. Training of the third set of ML model(s) 1125 does not require any specialized multi-sensor capture environment, since the image(s) 1150 can be provided using a camera such as any of cameras 440A-440D of the mobile handset 410. Thus, training of the third set of ML model(s) 1125 can be performed with the help of the user 1110, without requiring the user 1110 to obtain any specialized multi-sensor capture environment or go anywhere that has such a specialized multi-sensor capture environment.

Figure 12:
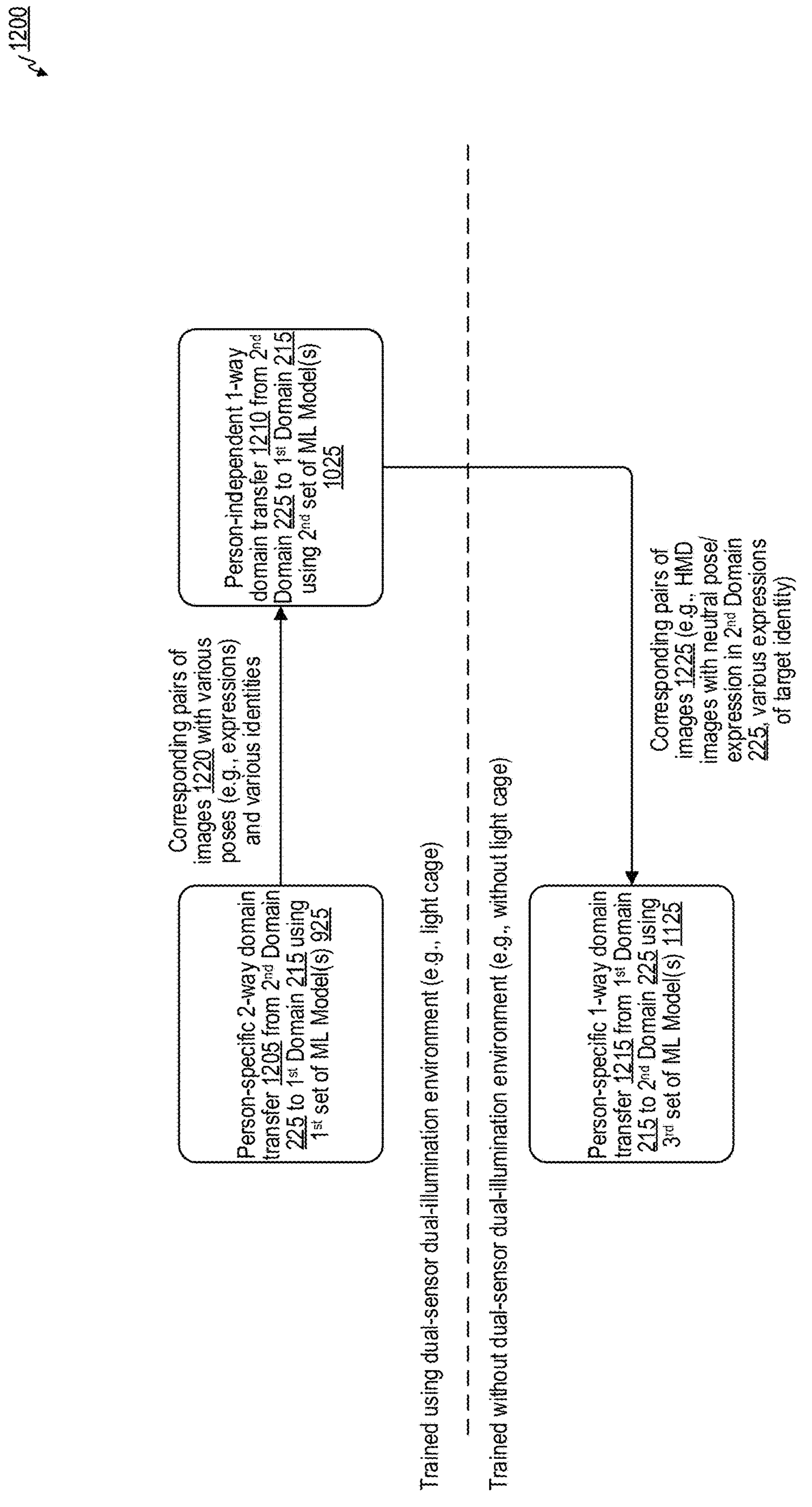
FIG. 12 is a block diagram illustrating an imaging system for training and/or use of the first set of one or more machine learning (ML) models, the second set of one or more ML models, and the third set of one or more ML models, in accordance with some examples.

FIG. 12 is a block diagram illustrating an imaging system 1200 for training and/or use of the first set of one or more machine learning (ML) models 925, the second set of one or more ML models 1025, and the third set of one or more ML models 1125. The imaging system 1200 performs a person-specific 2-way domain transfer 1205 from the second EM frequency domain 225 (e.g., visible light domain) to the first EM frequency domain 215 (e.g., IR and/or NR domain) using the first set of ML model(s) 925. The imaging system 1200 passes corresponding pairs of images 1220 with various poses (e.g., expressions) and various identities from the first set of ML model(s) 925 to the second set of ML model(s) 1025. The imaging system 1200 performs a person-independent 1-way domain transfer 1210 from the second EM frequency domain 225 (e.g., visible light domain) to the first EM frequency domain 215 (e.g., IR and/or NIR domain) using the second set of ML model(s) 1025.

The imaging system 1200 passes corresponding pairs of images 1225 from the second set of ML model(s) 1025 to the third set of ML model(s) 1125. The images 1225 can include images captured by camera(s) 330A-330F of the HMD 310, and/or simulating the respective perspectives of camera(s) 330A-330F of HID 310. In some examples, at least some of the images 1225 can include a neutral pose (e.g., expression). In some examples, at least some of the images 1225 can include a specific pose (e.g., expression) to be reproduced in the image in the second EM frequency domain 225 to be generated using the third set of ML model(s) 1125. In some examples, at least some of the images 1225 can include identity information for a target person's identity in the second EM frequency domain 225 (e.g., coloring of part(s) of the user and/or textures of part(s) of the user) to be reproduced in the image in the second EM frequency domain 225 to be generated using the third set of ML model(s) 1125. The imaging system 1200 performs a person-specific 1-way domain transfer 1215 from the first EM frequency domain 215 (e.g., IR and/or NIR domain) to the second EM frequency domain 225 (e.g., visible light domain) using the third set of ML model(s) 1125.

A dashed horizontal line is illustrated, separating the third set of ML model(s) 1125 from the first set of ML model(s) 925 and the second set of ML model(s) 1025. The dashed horizontal line indicates that the imaging system 1200 can train the first set of ML model(s) 925 and the second set of ML model(s) 1025 using image data captured using a specialized multi-sensor capture environment (e.g., a light cage) with light source(s) providing illumination in the first EM frequency domain 215, sensor(s) capturing images in the first EM frequency domain 215, light source(s) providing illumination in the second EM frequency domain 225, sensor(s) capturing images in the second EM frequency domain 225, or a combination thereof. The dashed horizontal line indicates that the imaging system 1200 can train the third set of ML model(s) 1125 without use of such a specialized multi-sensor capture environment. For instance, the imaging system 1200 can train the third set of ML model(s) 1125 using image(s) captured using other types of cameras, such as any of the cameras 330A-330G of the HMD 310, any of the cameras 430A-430D of the mobile handset 410, and/or rendered images (e.g., rendered image 255, rendered image 540, rendered image 640, rendered image 740, rendered image 840, rendered images 1160).

In some examples, the domain transfer coder 815 includes the third set of ML model(s) 1125 (e.g., the feature encoder 1130, the feature encoder 1135, and/or the image decoder 1140). This can improve the accuracy of the loss function 850, in turn improving the training of the avatar coder 820 to generate the avatar data 830 in the second EM frequency domain 225 (e.g., visible light domain) directly from the image(s) 805 in the first EM frequency domain 215 (e.g., IR and/or NIR domain).

Figure 13:
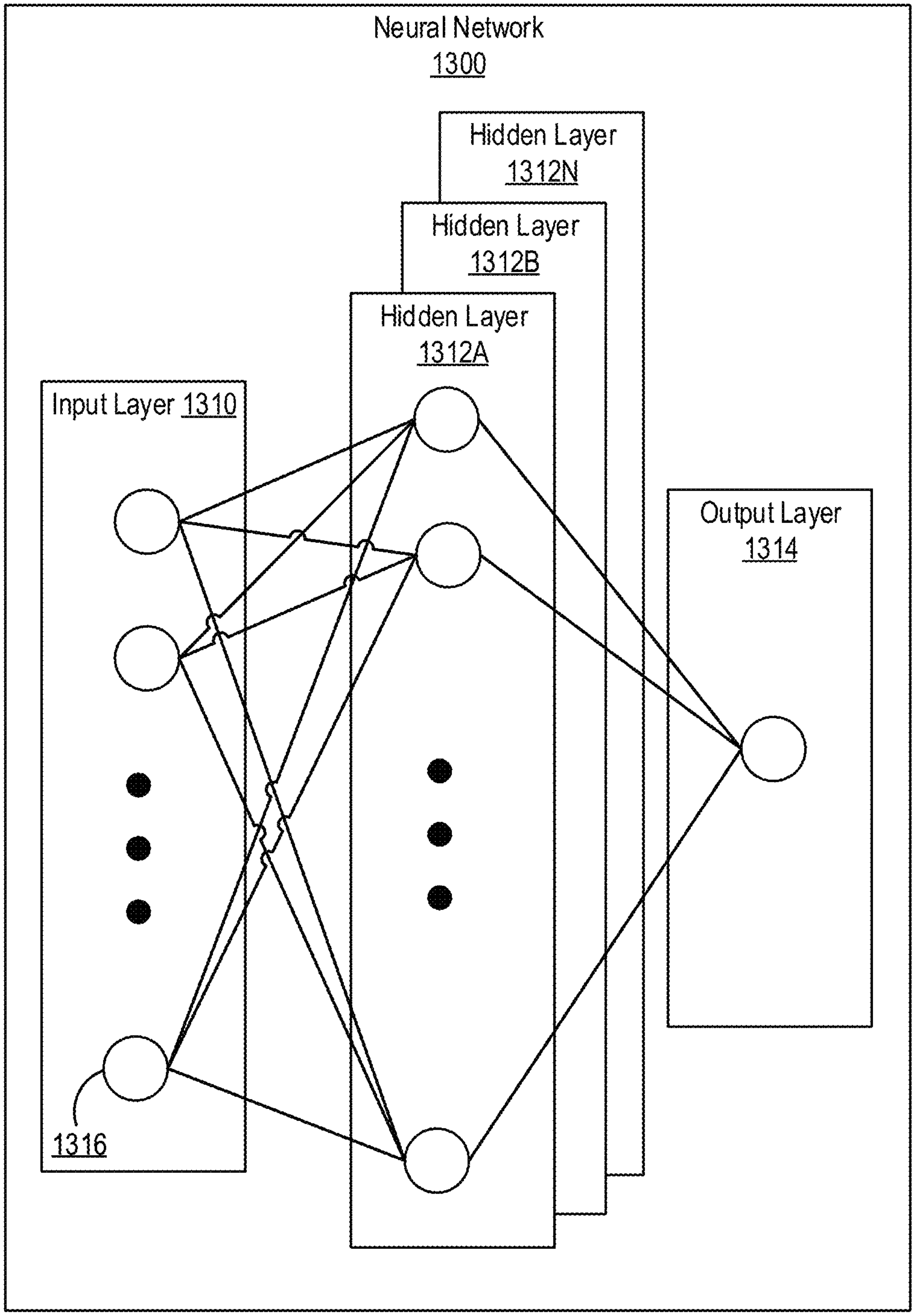
FIG. 13 is a block diagram illustrating an example of a neural network that can be used for image processing operations, in accordance with some examples.

FIG. 13 is a block diagram illustrating an example of a neural network (NN) 1300 that can be used for media processing operations. The neural network 1300 can include any type of deep network, such as a convolutional neural network (CNN), an autoencoder, a deep belief net (DBN), a Recurrent Neural Network (RNN), a Generative Adversarial Networks (GAN), and/or other type of neural network. The neural network 1300 may be an example of one of the ML engine 230, the ML model(s) 235, the feature encoder 515, the avatar decoder 525, the rendering engine 535, the objective function 545, the feature encoder 615, the objective function 645, the domain transfer coder 815, the avatar coder 820, the loss function 850, the first set of ML model(s) 925, the feature encoder 930, the feature encoder 935, the image decoder 940, the second set of ML model(s) 1025, the feature encoder 1030, the feature encoder 1035, the image decoder 1040, the third set of ML model(s) 1125, the feature encoder 1130, the feature encoder 1135, the image decoder 1140, the one or more trained ML models of operation 1415, one or more additional trained ML model(s) used in the process 1400, or a combination thereof. The neural network 1300 may used by the ML engine 230, the ML model(s) 235, the feature encoder 515, the avatar decoder 525, the rendering engine 535, the objective function 545, the feature encoder 615, the objective function 645, the domain transfer coder 815, the avatar coder 820, the loss function 850, the first set of ML model(s) 925, the feature encoder 930, the feature encoder 935, the image decoder 940, the second set of ML model(s) 1025, the feature encoder 1030, the feature encoder 1035, the image decoder 1040, the third set of ML model(s) 1125, the feature encoder 1130, the feature encoder 1135, the image decoder 1140, the one or more trained ML models of operation 1415, one or more additional trained ML model(s) used in the process 1400, the computing system 1500, or a combination thereof An input layer 1310 of the neural network 1300 includes input data. The input data of the input layer 1310 can include data representing the pixels of one or more input image frames. In some examples, the input data of the input layer 1310 includes data representing the pixels of image data, such as image data captured using the image capture and processing system 100, the image 205, the image 275, the images 360A-360C, other image(s) captured using any of the cameras 330A-330F, image(s) captured using any of the cameras 430A-430D, the images 505, the images 605, the images 705, the image(s) 805, the image(s) 860, the image(s) 905, the image(s) 920, the image(s) 945, the image(s) 1005, the image(s) 1020, the image(s) 1045, the image(s) 1105, the image(s) 1120, the image(s) 1145, the pairs of images 1220, the pairs of images 1225, another set of one or more images described herein, or a combination thereof.

The images can include image data from an image sensor including raw pixel data (including a single color per pixel based, for example, on a Bayer filter) or processed pixel values (e.g., RGB pixels of an RGB image). The neural network 1300 includes multiple hidden layers 1312A, 1312B, through 1312N. The hidden layers 1312A, 1312B, through 1312N include "N" number of hidden layers, where "N" is an integer greater than or equal to one. The number of hidden layers can be made to include as many layers as needed for the given application. The neural network 1300 further includes an output layer 1314 that provides an output resulting from the processing performed by the hidden layers 1312A, 1312B, through 1312N.

In some examples, the output layer 1314 can provide an output image, such as the mesh 240, the texture 245, the avatar generated using the mesh 240 and the texture 245, the rendered image 255, the encoded expression 520, the avatar data 530, an avatar generated using the avatar data 530, the rendered image 540, the encoded expression 620, the avatar data 630, an avatar generated using the avatar data 630, the rendered image 640, the encoded expression 720, the avatar data 730, an avatar generated using the avatar data 730, the rendered image 740, the encoded expression 825, the avatar data 830, an avatar generated using the avatar data 830, the rendered image 840, the image(s) 860, the image(s) 945, the image(s) 1020, the image(s) 1045, the image(s) 1105, the image(s) 1120, the image(s) 1145, the avatar data 1155, the rendered images 1160, the pairs of images 1220, the pairs of images 1225, or a combination thereof. In some examples, the output layer 1314 can provide other types of data as well, such as face detection data, face recognition data, face tracking data, or a combination thereof.

The neural network 1300 is a multi-layer neural network of interconnected filters. Each filter can be trained to learn a feature representative of the input data. Information associated with the filters is shared among the different layers and each layer retains information as information is processed. In some cases, the neural network 1300 can include a feed-forward network, in which case there are no feedback connections where outputs of the network are fed back into itself. In some cases, the network 1300 can include a recurrent neural network, which can have loops that allow information to be carried across nodes while reading in input.

In some cases, information can be exchanged between the layers through node-to-node interconnections between the various layers. In some cases, the network can include a convolutional neural network, which may not link every node in one layer to every other node in the next layer. In networks where information is exchanged between layers, nodes of the input layer 1310 can activate a set of nodes in the first hidden layer 1312A. For example, as shown, each of the input nodes of the input layer 1310 can be connected to each of the nodes of the first hidden layer 1312A. The nodes of a hidden layer can transform the information of each input node by applying activation functions (e.g., filters) to this information. The information derived from the transformation can then be passed to and can activate the nodes of the next hidden layer 1312B, which can perform their own designated functions. Example functions include convolutional functions, downscaling, upscaling, data transformation, and/or any other suitable functions. The output of the hidden layer 1312B can then activate nodes of the next hidden layer, and so on. The output of the last hidden layer 1312N can activate one or more nodes of the output layer 1314, which provides a processed output image. In some cases, while nodes (e.g., node 1316) in the neural network 1300 are shown as having multiple output lines, a node has a single output and all lines shown as being output from a node represent the same output value.

In some cases, each node or interconnection between nodes can have a weight that is a set of parameters derived from the training of the neural network 1300. For example, an interconnection between nodes can represent a piece of information learned about the interconnected nodes. The interconnection can have a tunable numeric weight that can be tuned (e.g., based on a training dataset), allowing the neural network 1300 to be adaptive to inputs and able to learn as more and more data is processed.

The neural network 1300 is pre-trained to process the features from the data in the input layer 1310 using the different hidden layers 1312A, 1312B, through 1312N in order to provide the output through the output layer 1314.

Figure 14:
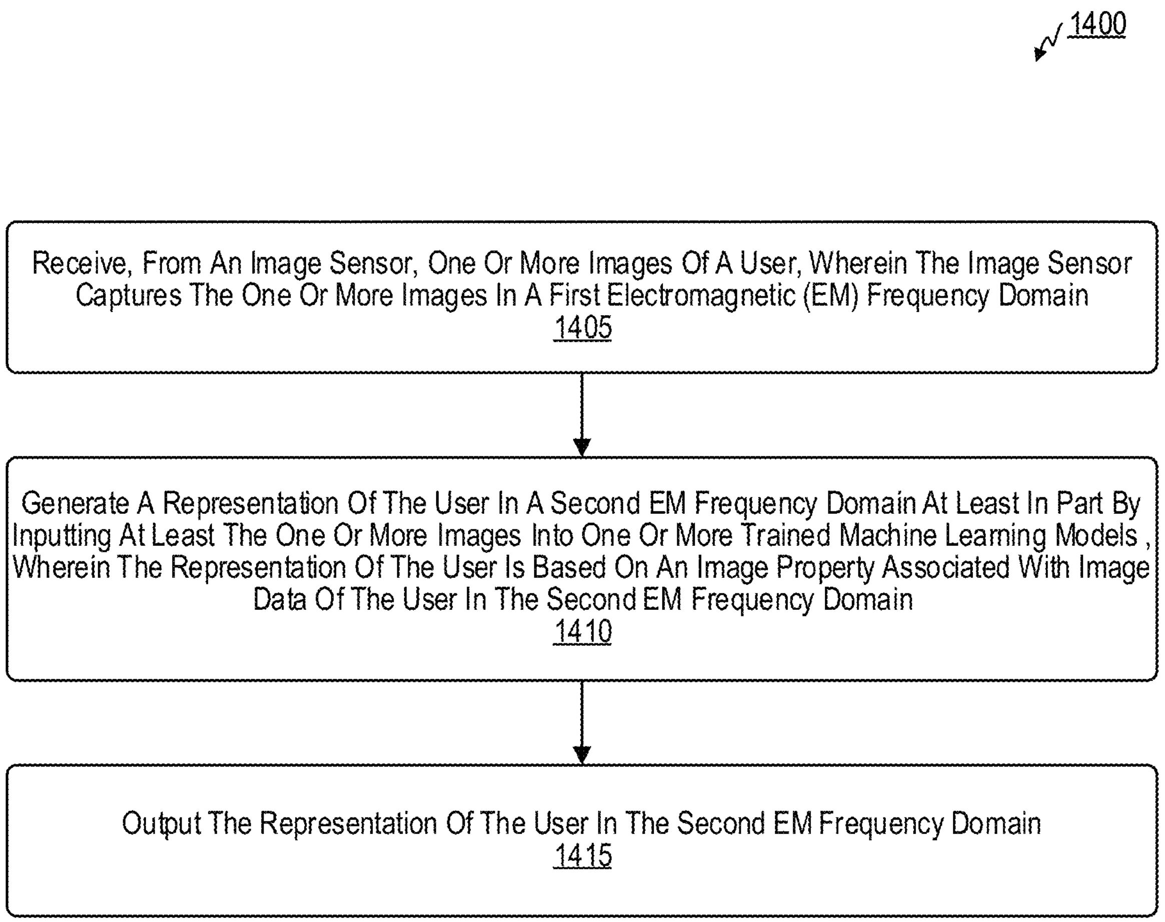
FIG. 14 is a flow diagram illustrating an image processing process, in accordance with some examples.

FIG. 14 is a flow diagram illustrating an imaging process 1400. The imaging process 1400 may be performed by an imaging system. In some examples, the imaging system can include, for example, the image capture and processing system 100, the image capture device 105A, the image processing device 105B, the image processor 150, the ISP 154, the host processor 152, the imaging system 200, the sensor(s) 210, the sensor(s) 220, the ML engine 230, the ML model(s) 235, the rendering engine 250, the output device(s) 260, the transceiver(s) 265, the feedback engine 270, the HMD 310, the mobile handset 410, the imaging system 500, the feature encoder 515, the avatar decoder 525, the rendering engine 535, the objective function 545, the imaging system 600, the feature encoder 615, the objective function 645, the imaging system 700, the imaging system 800, the domain transfer coder 815, the avatar coder 820, the loss function 850, the imaging system 900, the first set of ML model(s) 925, the feature encoder 930, the feature encoder 935, the image decoder 940, the imaging system 1000, the second set of ML model(s) 1025, the feature encoder 1030, the feature encoder 1035, the image decoder 1040, the imaging system 1100, the third set of ML model(s) 1125, the feature encoder 1130, the feature encoder 1135, the image decoder 1140, the imaging system 1200, the neural network 1300, the computing system 1500, the processor 1510, or a combination thereof.

At operation 1405, the imaging system is configured to, and can, receive, from an image sensor, one or more images of a user. The first image sensor captures the one or more images in a first electromagnetic (EM) frequency domain. In some examples, the one or more images of the user may include one or more images of at least a part of the user.

In some examples, the imaging system includes an image sensor connector that couples and/or connects the image sensor to at least a portion of a remainder of the imaging system (e.g., including the processor and/or the memory of the imaging system), In some examples, the imaging system receives the first set of one or more images from the image sensor by receiving the first set of one or more images from, over, and/or using the image sensor connector.

Examples of the image sensor includes the image sensor 130, the sensor(s) 210, the sensor(s) 220, the first camera 330A, the second camera 330B, the third camera 330C, the fourth camera 330D, the fifth camera 330E, the sixth camera 330F, the seventh camera 330G, the first camera 430A, the second camera 430B, the third camera 430C, the fourth camera 430D, an image sensor that captures any of the images of FIGS. 5-12, an image sensor used to capture an image used as input data for the input layer 1310 of the NN 1300, the input device 1545, another image sensor described herein, another sensor described herein, or a combination thereof.

Examples of the image data include image data captured using the image capture and processing system 100, the image 205, the image 275, the images 360A-360C, other image(s) captured using any of the cameras 330A-330F, image(s) captured using any of the cameras 430A-430D, the images 505, the images 605, the images 705, the image(s) 805, the image(s) 860, the image(s) 905, the image(s) 920, the image(s) 945, the image(s) 1005, the image(s) 1020, the image(s) 1045, the image(s) 1105, the image(s) 1120, the image(s) 1145, the pairs of images 1220, the pairs of images 1225, another set of one or more images described herein, or a combination thereof.

In some examples, the one or more images of the user may include one or more images of the user in a pose. In some examples, the pose includes a facial expression of the user. In some examples, the pose includes a position of the user. The position can include a position of at least a part of the user in the one or more images (e.g., with 2D coordinates of pixels representing at least the part of the user). The position can include a position of at least a part of the user in an environment (e.g., with 3D coordinates of least the part of the user in the environment). The environment may be a real-world environment, a virtual environment, or a combination thereof. In some examples, the pose includes an orientation (e.g., yaw, pitch, and/or roll) of at least a part of the user. In some examples, the pose includes a head pose and/or a face pose. Examples of the pose may include the encoded expression 520, the encoded expression 620, the encoded expression 720, the encoded expression 825, the encoded expression 520, the pose(s) and/or expression(s) in the image(s) 1005, the pose(s) and/or expression(s) in the image(s) 1120, the pose(s) and/or expression(s) in the image(s) 1220, the pose(s) and/or expression(s) in the image(s) 1225, or a combination thereof.

At operation 1410, the imaging system is configured to, and can, generate a representation of the user in a second EM frequency domain at least in part by inputting at least the one or more images into one or more trained machine learning models. The representation of the user is based on an image property associated with image data of the user in the second EM frequency domain. In examples where the one or more images of the user include one or more images of the user in a pose, the generated representation of the user in the second EM frequency domain may include a generated representation of the user in the pose in the second EM frequency domain. In examples where the one or more images of the user include one or more images of at least a past of the user (e.g., a face of the user), the generated representation of the user in the second EM frequency domain may include a generated representation of at least the part of the user (e.g., the face of the user) in the second EM frequency domain.

Examples of the representation of the user in a second EM frequency domain include the mesh 240, the texture 245, the avatar generated using the mesh 240 and the texture 245, the rendered image 255, the encoded expression 520, the avatar data 530, an avatar generated using the avatar data 530, the rendered image 540, the encoded expression 620, the avatar data 630, an avatar generated using the avatar data 630, the rendered image 640, the encoded expression 720, the avatar data 730, an avatar generated using the avatar data 730, the rendered image 740, the encoded expression 825, the avatar data 830, an avatar generated using the avatar data 830, the rendered image 840, the image(s) 860, the image(s) 945, the image(s) 1020, the image(s) 1045, the image(s) 1105, the image(s) 1120, the image(s) 1145, the avatar data 1155, the rendered images 1160, the pairs of images 1220, the pairs of images 1225, or a combination thereof.

Examples of the one or more trained machine learning models include the ML engine 230, the ML model(s) 235, the feature encoder 515, the avatar decoder 525, the rendering engine 535, the objective function 545, the feature encoder 615, the objective function 645, the domain transfer coder 815, the avatar coder 820, the loss function 850, the first set of ML model(s) 925, the feature encoder 930, the feature encoder 935, the image decoder 940, the second set of ML model(s) 1025, the feature encoder 1030, the feature encoder 1035, the image decoder 1040, the third set of ML model(s) 1125, the feature encoder 1130, the feature encoder 1135, the image decoder 1140, the neural network 1300, one or more NNs, one or more CNNs, one or more TDNNs, one or more deep networks, one or more autoencoders, one or more DBNs, one or more RNNs, one or more GANs, one or more cGANs, one or more SVMs, one or more RFs, one or more computer vision systems, one or more deep learning systems, one or more transformers, or a combination thereof.

In some examples, the imaging system is configured to, and can, store the image data of at least some of the user in the second EM frequency domain. In some examples, inputting at least the one or more images into the one or more trained machine learning models includes also inputting the image data into the one or more trained machine learning models.

In some examples, the image property includes color information. In some examples, at least one color in the representation of the user in the second EM frequency domain is based on the color information associated with the image data of the user in the second EM frequency domain. In some examples, the image property includes identity information. In some examples, the identity of the user in the representation of the user in the second EM frequency domain is based on the identity information associated with the image data of the user in the second EM frequency domain. Examples of the image data, and/or the image property, can include, for instance, the image 275, the images 505, the encoded expression 520, identity and/or color information in the image(s) 905, identity and/or color information in the image(s) 1020, identity and/or color information in the image(s) 1105, identity and/or color information in the image(s) 1220, identity and/or color information in the image(s) 1225, or combinations thereof.

In some examples, the imaging system is configured to, and can, receive the image data from a second image sensor that captures the image data. In some examples, the imaging system includes an image sensor connector that couples and/or connects the second image sensor to at least a portion of a remainder of the imaging system (e.g., including the processor and/or the memory of the imaging system), In some examples, the imaging system receives the image data from the second image sensor by receiving the image data from, over, and/or using the image sensor connector. Examples of the second image sensor include the examples of the first image sensor listed above. Examples of the image data include the examples of the first set of one or more images listed above.

In some examples, the representation of the user in the second EM frequency domain includes a texture in the second EM frequency domain. The texture is configured to apply to a three-dimensional mesh representation of the user. In some examples, the representation of the user in the second EM frequency domain includes a three-dimensional mesh representation of the user. In some examples, the representation of the user in the second EM frequency domain includes three-dimensional model of the user that is textured using a texture in the second EM frequency domain. Examples of the mesh, the texture, and/or the model include the mesh 240, the texture 245, a model generated by the rendering engine 250 by applying the texture 245 to the mesh 240, the rendered image 255, the avatar data 530, the rendered image 540, the avatar data 630, the rendered image 640, the avatar data 730, the rendered image 740, the avatar data 830, the rendered image 840, the avatar data 1155, the rendered images 1160, or a combination thereof.

In some examples, the representation of the user in the second EM frequency domain includes a rendered image of a three-dimensional model of the user and from a specified perspective. The rendered image is in the second EM frequency domain. The rendered image is in the second EM frequency domain. In some examples, the representation of the user in the second EM frequency domain includes an image of the user in the second EM frequency domain. Examples of the rendered image, and/or the image, include the rendered image 255, the rendered image 540, the rendered image 640, the rendered image 740, the rendered image 840, the rendered images 1160, the image(s) 1105, the image(s) 1120, or a combination thereof.

In some examples, the one or more trained machine learning models have training that is specific to the user, and/or that is person-specific. In some examples, the one or more trained machine learning models have training that is independent of which user is using it, and/or that can be used by any user, and/or that is person-independent and/or generalized.

In some examples, the one or more trained machine learning models are trained using a first image of the user in the first EM frequency domain and a second image of the user in the second EM frequency domain. The first image of the user in the first EM frequency domain is generated by a second set of one or more machine learning models based on input of the second image of the user in the second EM frequency domain into the second set of one or more machine learning models. In the context of FIG. 11, an example of the second image is the image(s) 1105, an example of the first image is the image(s) 1120, and an example of the second set of one or more machine learning models is the feature encoder 515, the avatar decoder 525, the first set of ML model(s) 925, and/or the second set of ML model(s) 1025. In some examples, the second set of one or more machine learning models can include the ML engine 230, the ML model(s) 235, the feature encoder 515, the avatar decoder 525, the rendering engine 535, the objective function 545, the feature encoder 615, the objective function 645, the domain transfer coder 815, the avatar coder 820, the loss function 850, the first set of ML model(s) 925, the feature encoder 930, the feature encoder 935, the image decoder 940, the second set of ML model(s) 1025, the feature encoder 1030, the feature encoder 1035, the image decoder 1040, the third set of ML model(s) 1125, the feature encoder 1130, the feature encoder 1135, the image decoder 1140, the neural network 1300, one or more NNs, one or more CNNs, one or more TDNNs, one or more deep networks, one or more autoencoders, one or more DBNs, one or more RNNs, one or more GANs, one or more cGANs, one or more SVMs, one or more RFs, one or more computer vision systems, one or more deep learning systems, one or more transformers, or a combination thereof.

At operation 1415, the imaging system is configured to, and can, output the representation of the user in the second EM frequency domain.

In some examples, outputting the representation of the user in the second EM frequency domain at operation 1415 includes causing the representation of the user in the second EM frequency domain to be displayed using at least the display. In some examples, the imaging system includes the display (e.g., the output device(s) 260 and/or the output device 1535)

In some examples, outputting the representation of the user in the second EM frequency domain at operation 1415 includes causing the representation of the user in the second EM frequency domain to be transmitted to at least a recipient device using at least a communication interface. In some examples, the imaging system includes the communication interface (e.g., the transceiver(s) 265, the output device 1535, and/or the communication interface 1540).

In some examples, outputting the representation of the user in the second EM frequency domain at operation 1415 includes including the representation of the user in the second EM frequency domain in training data. The training data is to be used to train a second set of one or more machine learning models using the representation of the user in the second EM frequency domain. For instance, in the context of FIG. 8, the one or more trained ML models of operation 1410 can correspond to the domain transfer coder 815, the second set of one or more ML models can correspond to the avatar coder 820, and the training data can be fed into the loss function 850. In the context of FIG. 11, the second set of one or more ML models can correspond to the third set of ML model(s) 1125, while the one or more trained ML models of operation 1410 can correspond to the feature encoder 515, the avatar decoder 525, the first set of ML model(s) 925, and/or the second set of ML model(s) 1025.

In some examples, the second set of one or more machine learning models can include the ML engine 230, the ML model(s) 235, the feature encoder 515, the avatar decoder 525, the rendering engine 535, the objective function 545, the feature encoder 615, the objective function 645, the domain transfer coder 815, the avatar coder 820, the loss function 850, the first set of ML model(s) 925, the feature encoder 930, the feature encoder 935, the image decoder 940, the second set of ML model(s) 1025, the feature encoder 1030, the feature encoder 1035, the image decoder 1040, the third set of ML model(s) 1125, the feature encoder 1130, the feature encoder 1135, the image decoder 1140, the neural network 1300, one or more NNs, one or more CNNs, one or more TDNNs, one or more deep networks, one or more autoencoders, one or more DBNs, one or more RNNs, one or more GANs, one or more cGANs, one or more SVMs, one or more RFs, one or more computer vision systems, one or more deep learning systems, one or more transformers, or a combination thereof.

In some examples, outputting the representation of the user in the second EM frequency domain at operation 1415 includes training a second set of one or more machine learning models using the representation of the user in the second EM frequency domain as training data. The second set of one or more machine learning models are configured to generate a three-dimensional mesh for an avatar of the user and a texture to apply to the three-dimensional mesh for the avatar of the user based on providing (e.g., input of) image data in the first EM frequency domain into the second set of one or more machine learning models. For instance, in the context of FIG. 8, the one or more trained ML models of operation 1410 can correspond to the domain transfer coder 815, the second set of one or more ML models can correspond to the avatar coder 820, and the training data can be fed into the loss function 850. In the context of FIG. 11, the second set of one or more ML models can correspond to the third set of ML model(s) 1125, while the one or more trained ML models of operation 1410 can correspond to the feature encoder 515, the avatar decoder 525, the first set of ML model(s) 925, and/or the second set of ML model(s) 1025.

In some examples, the second set of one or more machine learning models can include the ML engine 230, the ML model(s) 235, the feature encoder 515, the avatar decoder 525, the rendering engine 535, the objective function 545, the feature encoder 615, the objective function 645, the domain transfer coder 815, the avatar coder 820, the loss function 850, the first set of ML model(s) 925, the feature encoder 930, the feature encoder 935, the image decoder 940, the second set of ML model(s) 1025, the feature encoder 1030, the feature encoder 1035, the image decoder 1040, the third set of ML model(s) 1125, the feature encoder 1130, the feature encoder 1135, the image decoder 1140, the neural network 1300, one or more NNs, one or more CNNs, one or more TDNNs, one or more deep networks, one or more autoencoders, one or more DBNs, one or more RNNs, one or more GANs, one or more cGANs, one or more SVMs, one or more RFs, one or more computer vision systems, one or more deep learning systems, one or more transformers, or a combination thereof.

In some examples, outputting the representation of the user in the second EM frequency domain at operation 1415 includes inputting the representation of the user in the second EM frequency domain into a second set of one or more machine learning models. The second set of one or more machine learning models are configured to generate a three-dimensional mesh for an avatar of the user and a texture to apply to the three-dimensional mesh for the avatar of the user based on input of the representation of the user in the second EM frequency domain into the second set of one or more machine learning models. For instance, in the context of FIG. 8, the one or more trained ML models of operation 1410 can correspond to the domain transfer coder 815, the second set of one or more ML models can correspond to the avatar coder 820, and the training data can be fed into the loss function 850. In the context of FIG. 11, the second set of one or more ML models can correspond to the third set of ML model(s) 1125, while the one or more trained ML models of operation 1410 can correspond to the feature encoder 515, the avatar decoder 525, the first set of ML model(s) 925, and/or the second set of ML model(s) 1025.

In some examples, the second set of one or more machine learning models can include the ML engine 230, the ML model(s) 235, the feature encoder 515, the avatar decoder 525, the rendering engine 535, the objective function 545, the feature encoder 615, the objective function 645, the domain transfer coder 815, the avatar coder 820, the loss function 850, the first set of ML model(s) 925, the feature encoder 930, the feature encoder 935, the image decoder 940, the second set of ML model(s) 1025, the feature encoder 1030, the feature encoder 1035, the image decoder 1040, the third set of ML model(s) 1125, the feature encoder 1130, the feature encoder 1135, the image decoder 1140, the neural network 1300, one or more NNs, one or more CNNs, one or more TDNNs, one or more deep networks, one or more autoencoders, one or more DBNs, one or more RNNs, one or more GANs, one or more cGANs, one or more SVMs, one or more RFs, one or more computer vision systems, one or more deep learning systems, one or more transformers, or a combination thereof.

In some examples, the imaging system that performs the imaging process 1400 includes at least one of a head-mounted display (HMD) (e.g., HMD 31), a mobile handset (e.g., mobile handset 410), or a wireless communication device. In some aspects, the imaging system that performs the imaging process 1400 includes one or more network servers. In such examples, receiving the one or more images at operation 1405 includes receiving the one or more images from a user device over a network, and outputting the representation of the user in the second EM frequency domain at operation 1415 includes causing the representation of the user in the second EM frequency domain to be transmitted from the one or more network servers to the user device over the network.

In some examples, the imaging system can includes: means for receiving, from an image sensor, one or more images of a user in a pose, wherein the image sensor captures the one or more images in a first electromagnetic (EM) frequency domain; means for generating a representation of the user in a second EM frequency domain at least in part by inputting at least the one or more images into one or more trained machine learning models, wherein the representation of the user is based on an image property associated with image data of the user in the second EM frequency domain; and means for outputting the representation of at least the part the user in the second EM frequency domain.

In some examples, the means for receiving the one or more images includes the image capture and processing system 100, the image capture device 105A, the image processing device 105B, the image processor 150, the ISP 154, the host processor 152, the image sensor 130, the sensor(s) 210, the sensor(s) 220, the first camera 330A, the second camera 330B, the third camera 330C, the fourth camera 330D, the fifth camera 330E, the sixth camera 330F, the seventh camera 330G, the first camera 430A, the second camera 430B, the third camera 430C, the fourth camera 430D, an image sensor that captures any of the images of FIGS. 5-12, an image sensor used to capture an image used as input data for the input layer 1310 of the NN 1300, the input device 1545, another image sensor described herein, another sensor described herein, or a combination thereof.

In some examples, the means for generating the representation of the user in a second EM frequency domain includes the image capture and processing system 100, the image processing device 105B, the image processor 150, the ISP 154, the host processor 152, the imaging system 200, the ML engine 230, the ML model(s) 235, the rendering engine 250, the output device(s) 260, the transceiver(s) 265, the feedback engine 270, the HMD 310, the mobile handset 410, the imaging system 500, the feature encoder 515, the avatar decoder 525, the rendering engine 535, the objective function 545, the imaging system 600, the feature encoder 615, the objective function 645, the imaging system 700, the imaging system 800, the domain transfer coder 815, the avatar coder 820, the loss function 850, the imaging system 900, the first set of ML model(s) 925, the feature encoder 930, the feature encoder 935, the image decoder 940, the imaging system 1000, the second set of ML model(s) 1025, the feature encoder 1030, the feature encoder 1035, the image decoder 1040, the imaging system 1100, the third set of ML model(s) 1125, the feature encoder 1130, the feature encoder 1135, the image decoder 1140, the imaging system 1200, the neural network 1300, the computing system 1500, the processor 1510, or a combination thereof.

In some examples, the means for outputting the representation of the user in a second EM frequency domain includes the image capture and processing system 100, the rendering engine 250, the output device(s) 260, the transceiver(s) 265, the feedback engine 270, the HMD 310, the display(s) 340, the mobile handset 410, the display 440, the imaging system 500, the avatar decoder 525, the rendering engine 535, the imaging system 600, the imaging system 700, the imaging system 800, the domain transfer coder 815, the avatar coder 820, the loss function 850, the imaging system 900, the first set of ML model(s) 925, the image decoder 940, the imaging system 1000, the second set of ML model(s) 1025, the image decoder 1040, the imaging system 1100, the third set of ML model(s) 1125, the feature encoder 1130, the feature encoder 1135, the image decoder 1140, the imaging system 1200, the neural network 1300, the computing system 1500, the processor 1510, the output device 1535, the communication interface 1540, or a combination thereof.

In some examples, the processes described herein (e.g., the respective processes of FIGS. 1, 2, 5, 6, 7, 8, 9, 10, 11, 12, 13, the process 1400 of FIG. 14, and/or other processes described herein) may be performed by a computing device or apparatus. In some examples, the processes described herein can be performed by the image capture and processing system 100, the image capture device 105A, the image processing device 105B, the image processor 150, the ISP 154, the host processor 152, imaging system 200, the sensor(s) 210, the sensor(s) 220, the ML engine 230, the ML model(s) 235, the rendering engine 250, the output device(s) 260, the transceiver(s) 265, the feedback engine 270, the HMD 310, the mobile handset 410, the imaging system 500, the imaging system 600, the imaging system 700, the imaging system 800, the imaging system 900, the imaging system 1000, the imaging system 1100, the imaging system 1200, the neural network 1300, the computing system 1500, the processor 1510, or a combination thereof.

The computing device can include any suitable device, such as a mobile device (e.g., a mobile phone), a desktop computing device, a tablet computing device, a wearable device (e.g., a VR headset, an AR headset, AR glasses, a network-connected watch or smartwatch, or other wearable device), a server computer, a vehicle or computing device of a vehicle, a robotic device, a television, and/or any other computing device with the resource capabilities to perform the processes described herein. In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, a network interface configured to communicate and/or receive the data, any combination thereof, and/or other component(s). The network interface may be configured to communicate and/or receive Internet Protocol (IP) based data or other type of data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

The processes described herein are illustrated as logical flow diagrams, block diagrams, or conceptual diagrams, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the processes described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 15:
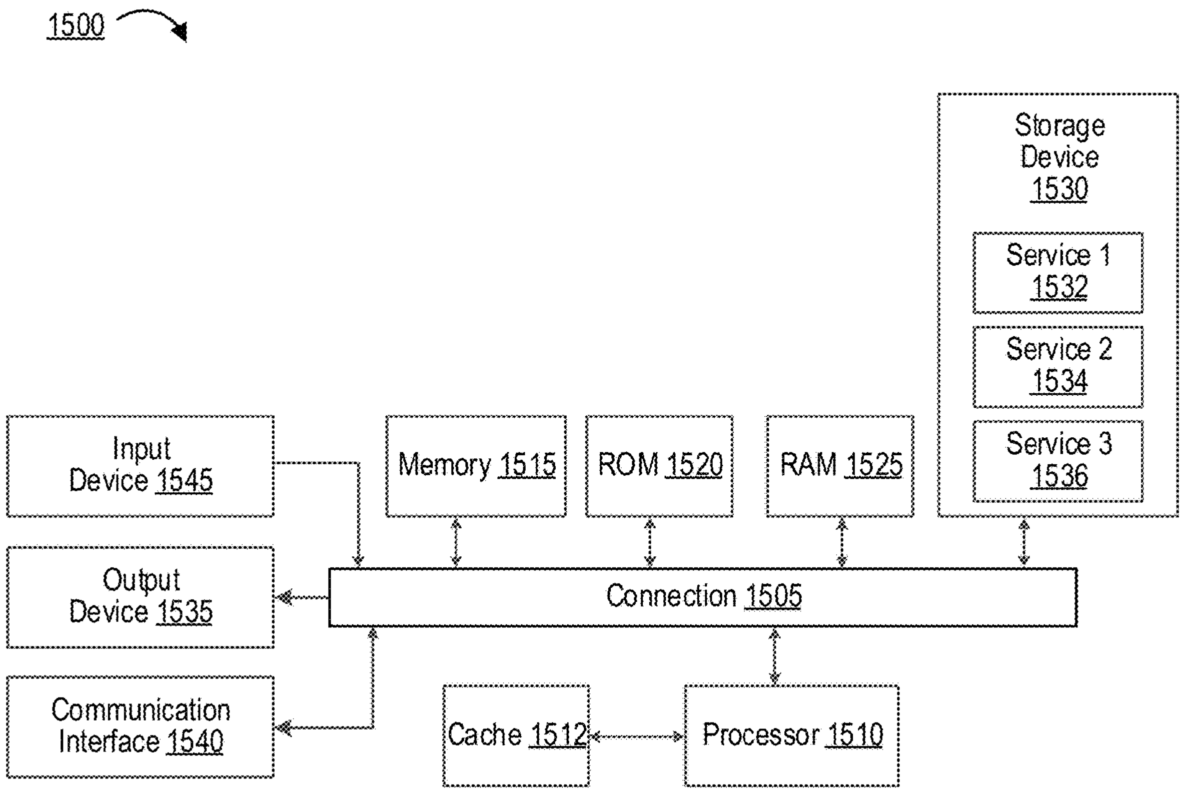
FIG. 15 is a diagram illustrating an example of a computing system for implementing certain aspects described herein.

FIG. 15 is a diagram illustrating an example of a system for implementing certain aspects of the present technology. In particular, FIG. 15 illustrates an example of computing system 1500, which can be for example any computing device making up internal computing system, a remote computing system, a camera, or any component thereof in which the components of the system are in communication with each other using connection 1505. Connection 1505 can be a physical connection using a bus, or a direct connection into processor 1510, such as in a chipset architecture. Connection 1505 can also be a virtual connection, networked connection, or logical connection.

In some aspects, computing system 1500 is a distributed system in which the functions described in this disclosure can be distributed within a datacenter, multiple data centers, a peer network, etc. In some aspects, one or more of the described system components represents many such components each performing some or all of the function for which the component is described. In some aspects, the components can be physical or virtual devices.

Example system 1500 includes at least one processing unit (CPU or processor) 1510 and connection 1505 that couples various system components including system memory 1515, such as read-only memory (ROM) 1520 and random access memory (RAM) 1525 to processor 1510. Computing system 1500 can include a cache 1512 of high-speed memory connected directly with, in close proximity to, or integrated as part of processor 1510.

Processor 1510 can include any general purpose processor and a hardware service or software service, such as services 1532, 1534, and 1536 stored in storage device 1530, configured to control processor 1510 as well as a special-purpose processor where software instructions are incorporated into the actual processor design. Processor 1510 may essentially be a completely self-contained computing system, containing multiple cores or processors, a bus, memory controller, cache, etc. A multi-core processor may be symmetric or asymmetric.

To enable user interaction, computing system 1500 includes an input device 1545, which can represent any number of input mechanisms, such as a microphone for speech, a touch-sensitive screen for gesture or graphical input, keyboard, mouse, motion input, speech, etc. Computing system 1500 can also include output device 1535, which can be one or more of a number of output mechanisms. In some instances, multimodal systems can enable a user to provide multiple types of input/output to communicate with computing system 1500. Computing system 1500 can include communications interface 1540, which can generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 1502.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 1540 may also include one or more Global Navigation Satellite System (GNSS) receivers or transceivers that are used to determine a location of the computing system 1500 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 1530 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L #), resistive random-access memory (RRAM/ReRAM), phase change memory (PCM), spin transfer torque RAM (STT-RAM), another memory chip or cartridge, and/or a combination thereof.

The storage device 1530 can include software services, servers, services, etc., that when the code that defines such software is executed by the processor 1510, it causes the system to perform a function. In some aspects, a hardware service that performs a particular function can include the software component stored in a computer-readable medium in connection with the necessary hardware components, such as processor 1510, connection 1505, output device 1535, etc., to carry out the function.

As used herein, the term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, or the like.

In some aspects, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the aspects and examples provided herein. However, it will be understood by one of ordinary skill in the art that the aspects may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, well-known circuits, processes, algorithms, structures, and techniques may be shown without unnecessary detail in order to avoid obscuring the aspects.

Individual aspects may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific aspects thereof, but those skilled in the art will recognize that the application is not limited thereto. Thus, while illustrative aspects of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, aspects can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate aspects, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" means A, B, or A and B. In another example, claim language reciting "at least one of A, B, and C" means A, B, C, or A and B, or A and C, or B and C, or A and B and C. The language "at least one of" a set and/or "one or more" of a set does not limit the set to the items listed in the set. For example, claim language reciting "at least one of A and B" can mean A, B, or A and B, and can additionally include items not listed in the set of A and B.

The various illustrative logical blocks, modules, circuits, and algorithm steps described in connection with the aspects disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

Illustrative aspects of the disclosure include:

Aspect 1: An apparatus for media processing, the apparatus comprising: a memory; and one or more processors coupled to the memory, the one or more processors configured to: receive, from an image sensor, one or more images of a user, wherein the image sensor captures the one or more images in a first electromagnetic (EM) frequency domain; generate a representation of the user in a second EM frequency domain at least in part by inputting at least the one or more images into one or more trained machine learning models, wherein the representation of the user is based on an image property associated with image data of the user in the second EM frequency domain; and output the representation of the user in the second EM frequency domain.

Aspect 2. The apparatus of Aspect 1, wherein, to output the representation of the user in the second EM frequency domain, the one or more processors are configured to include the representation of the user in the second EM frequency domain in training data, the training data to be used to train a second set of one or more machine learning models using the representation of the user in the second EM frequency domain.

Aspect 3. The apparatus of any of Aspects 1 to 2, wherein, to output the representation of the user in the second EM frequency domain, the one or more processors are configured to train a second set of one or more machine learning models using the representation of the user in the second EM frequency domain as training data, wherein the second set of one or more machine learning models are configured to generate a three-dimensional mesh for an avatar of the user and a texture to apply to the three-dimensional mesh for the avatar of the user based on providing image data in the first EM frequency domain into the second set of one or more machine learning models.

Aspect 4. The apparatus of any of Aspects 1 to 3, wherein, to output the representation of the user in the second EM frequency domain, the one or more processors are configured to input the representation of the user in the second EM frequency domain into a second set of one or more machine learning models, wherein the second set of one or more machine learning models are configured to generate a three-dimensional mesh for an avatar of the user and a texture to apply to the three-dimensional mesh for the avatar of the user based on input of the representation of the user in the second EM frequency domain into the second set of one or more machine learning models.

Aspect 5. The apparatus of any of Aspects 1 to 4, wherein the second EM frequency domain includes a visible light frequency domain, and wherein the first EM frequency domain is distinct from the visible light frequency domain.

Aspect 6. The apparatus of any of Aspects 1 to 5, wherein the first EM frequency domain includes least one of an infrared (IR) frequency domain or a near-infrared (NIR) frequency domain.

Aspect 7. The apparatus of any of Aspects 1 to 6, wherein the one or more processors are configured to: store the image data of the user in the second EM frequency domain, and wherein, to input at least the one or more images into one or more trained machine learning models, the one or more processors are configured to also input the image data into the one or more trained machine learning models.

Aspect 8. The apparatus of any of Aspects 1 to 7, wherein the one or more images of the user depict the user in a pose, wherein the representation of the user in the second EM frequency represents the user in the pose, and wherein the pose includes at least one of a position of at least a part of the user, an orientation of at least the part of the user, or a facial expression of the user.

Aspect 9. The apparatus of any of Aspects 1 to 8, wherein the representation of the user in the second EM frequency domain includes a texture in the second EM frequency domain, wherein the texture is configured to apply to a three-dimensional mesh representation of the user.

Aspect 10. The apparatus of any of Aspects 1 to 9, wherein the representation of the user in the second EM frequency domain includes three-dimensional model of the user that is textured using a texture in the second EM frequency domain.

Aspect 11. The apparatus of any of Aspects 1 to 10, wherein the representation of the user in the second EM frequency domain includes a rendered image of a three-dimensional model of the user and from a specified perspective, wherein the rendered image is in the second EM frequency domain.

Aspect 12. The apparatus of any of Aspects 1 to 11, wherein the representation of the user in the second EM frequency domain includes a rendered image of a three-dimensional model of the user and from a specified perspective, wherein the rendered image is in the second EM frequency domain.

Aspect 13. The apparatus of any of Aspects 1 to 12, wherein the representation of the user in the second EM frequency domain includes an image of the user in the second EM frequency domain.

Aspect 14. The apparatus of any of Aspects 1 to 13, wherein the image property includes color information, and wherein at least one color in the representation of the user in the second EM frequency domain is based on the color information associated with the image data of the user in the second EM frequency domain.

Aspect 15. The apparatus of any of Aspects 1 to 14, wherein the one or more trained machine learning models have training that is specific to the user.

Aspect 16. The apparatus of any of Aspects 1 to 15, wherein the one or more trained machine learning models are trained using a first image of the user in the first EM frequency domain and a second image of the user in the second EM frequency domain, wherein the first image of the user in the first EM frequency domain is generated by a second set of one or more machine learning models based on input of the second image of the user in the second EM frequency domain into the second set of one or more machine learning models.

Aspect 17. The apparatus of any of Aspects 1 to 16, further comprising: a display, wherein, to output the representation of the user in the second EM frequency domain, the one or more processors are configured to cause the representation of the user in the second EM frequency domain to be displayed using at least the display.

Aspect 18. The apparatus of any of Aspects 1 to 17, further comprising: a communication interface, wherein, to output the representation of the user in the second EM frequency domain, the one or more processors are configured to cause the representation of the user in the second EM frequency domain to be transmitted to at least a recipient device using at least the communication interface.

Aspect 19. The apparatus of any of Aspects 1 to 18, wherein the apparatus includes at least one of a head-mounted display (HMD), a mobile handset, or a wireless communication device.

Aspect 20. The apparatus of any of Aspects 1 to 19, wherein the apparatus includes one or more network servers, wherein, to receive the one or more images, the one or more processors are configured to receive the one or more images from a user device over a network, and wherein, to output the representation of the user in the second EM frequency domain, the one or more processors are configured to cause the representation of the user in the second EM frequency domain to be transmitted from the one or more network servers to the user device over the network.

Aspect 21. A method of imaging, the method comprising: receiving, from an image sensor, one or more images of a user, wherein the image sensor captures the one or more images in a first electromagnetic (EM) frequency domain; generating a representation of the user in a second EM frequency domain at least in part by inputting at least the one or more images into one or more trained machine learning models, wherein the representation of the user is based on an image property associated with image data of the user in the second EM frequency domain; and outputting the representation of at least the part the user in the second EM frequency domain.

Aspect 22. The method of Aspect 21, wherein outputting the representation of the user in the second EM frequency domain includes including the representation of the user in the second EM frequency domain in training data, the training data to be used to train a second set of one or more machine learning models using the representation of the user in the second EM frequency domain.

Aspect 23. The method of any of Aspects 21 to 22, wherein outputting the representation of the user in the second EM frequency domain includes training a second set of one or more machine learning models using the representation of the user in the second EM frequency domain as training data, wherein the second set of one or more machine learning models are configured to generate a three-dimensional mesh for an avatar of the user and a texture to apply to the three-dimensional mesh for the avatar of the user based on providing image data in the first EM frequency domain into the second set of one or more machine learning models.

Aspect 24. The method of any of Aspects 21 to 23, wherein outputting the representation of the user in the second EM frequency domain includes inputting the representation of the user in the second EM frequency domain into a second set of one or more machine learning models, wherein the second set of one or more machine learning models are configured to generate a three-dimensional mesh for an avatar of the user and a texture to apply to the three-dimensional mesh for the avatar of the user based on input of the representation of the user in the second EM frequency domain into the second set of one or more machine learning models.

Aspect 25. The method of any of Aspects 21 to 24, wherein the second EM frequency domain includes a visible light frequency domain, and wherein the first EM frequency domain is distinct from the visible light frequency domain.

Aspect 26. The method of any of Aspects 21 to 25, wherein the first EM frequency domain includes least one of an infrared (IR) frequency domain or a near-infrared (NIR) frequency domain.

Aspect 27. The method of any of Aspects 21 to 26, further comprising: storing the image data of the user in the second EM frequency domain, and wherein inputting at least the one or more images into the one or more trained machine learning models includes also inputting the image data into the one or more trained machine learning models.

Aspect 28. The method of any of Aspects 21 to 27, wherein the one or more images of the user depict the user in a pose, wherein the representation of the user in the second EM frequency represents the user in the pose, and wherein the pose includes at least one of a position of at least a part of the user, an orientation of at least the part of the user, or a facial expression of the user.

Aspect 29. The method of any of Aspects 21 to 28, wherein the representation of the user in the second EM frequency domain includes a texture in the second EM frequency domain, wherein the texture is configured to apply to a three-dimensional mesh representation of the user.

Aspect 30. The method of any of Aspects 21 to 29, wherein the representation of the user in the second EM frequency domain includes three-dimensional model of the user that is textured using a texture in the second EM frequency domain.

Aspect 31. The method of any of Aspects 21 to 30, wherein the representation of the user in the second EM frequency domain includes a rendered image of a three-dimensional model of the user and from a specified perspective, wherein the rendered image is in the second EM frequency domain.

Aspect 32. The method of any of Aspects 21 to 31, wherein the representation of the user in the second EM frequency domain includes a rendered image of a three-dimensional model of the user and from a specified perspective, wherein the rendered image is in the second EM frequency domain.

Aspect 33. The method of any of Aspects 21 to 32, wherein the representation of the user in the second EM frequency domain includes an image of the user in the second EM frequency domain.

Aspect 34. The method of any of Aspects 21 to 33, wherein the image property includes color information, and wherein at least one color in the representation of the user in the second EM frequency domain is based on the color information associated with the image data of the user in the second EM frequency domain.

Aspect 35. The method of any of Aspects 21 to 34, wherein the one or more trained machine learning models have training that is specific to the user.

Aspect 36. The method of any of Aspects 21 to 35, wherein the one or more trained machine learning models are trained using a first image of the user in the first EM frequency domain and a second image of the user in the second EM frequency domain, wherein the first image of the user in the first EM frequency domain is generated by a second set of one or more machine learning models based on input of the second image of the user in the second EM frequency domain into the second set of one or more machine learning models.

Aspect 37. The method of any of Aspects 21 to 36, wherein outputting the representation of the user in the second EM frequency domain includes causing the representation of the user in the second EM frequency domain to be displayed using at least the display.

Aspect 38. The method of any of Aspects 21 to 37, wherein outputting the representation of the user in the second EM frequency domain includes causing the representation of the user in the second EM frequency domain to be transmitted to at least a recipient device using at least a communication interface.

Aspect 39. The method of any of Aspects 21 to 38, wherein the method is performed using an apparatus that includes at least one of a head-mounted display (HMD), a mobile handset, or a wireless communication device.

Aspect 40. The method of any of Aspects 21 to 39, wherein the method is performed using an apparatus that includes one or more network servers, wherein receiving the one or more images includes receiving the one or more images from a user device over a network, and wherein outputting the representation of the user in the second EM frequency domain includes causing the representation of the user in the second EM frequency domain to be transmitted from the one or more network servers to the user device over the network.

Aspect 41: A non-transitory computer-readable medium having stored thereon instructions that, when executed by one or more processors, cause the one or more processors to: receive, from an image sensor, one or more images of a user, wherein the image sensor captures the one or more images in a first electromagnetic (EM) frequency domain; generate a representation of the user in a second EM frequency domain at least in part by inputting at least the one or more images into one or more trained machine learning models, wherein the representation of the user is based on an image property associated with image data of the user in the second EM frequency domain; and output the representation of the user in the second EM frequency domain.

Aspect 42: The non-transitory computer-readable medium of Aspect 43, further comprising operations according to any of Aspects 2 to 20, and/or any of Aspects 22 to 40.

Aspect 43: An apparatus for imaging, the apparatus comprising: means for receiving, from an image sensor, one or more images of a user, wherein the image sensor captures the one or more images in a first electromagnetic (EM) frequency domain; means for generating a representation of the user in a second EM frequency domain at least in part by inputting at least the one or more images into one or more trained machine learning models, wherein the representation of the user is based on an image property associated with image data of the user in the second EM frequency domain; and means for outputting the representation of at least the part the user in the second EM frequency domain.

Aspect 44: The apparatus of Aspect 43, further comprising means for performing operations according to any of Aspects 2 to 20, and/or any of Aspects 22 to 40.

What is claimed is:

1. An apparatus for imaging, the apparatus comprising:

at least one memory; and one or more processors coupled to the at least one memory, the one or more processors configured to:

receive, from an image sensor, one or more greyscale images of a plurality of body parts of a user, wherein the image sensor captures light in an electromagnetic (EM) frequency domain other than a visible light frequency domain, and wherein the image sensor maps different frequencies of the light in the EM frequency domain to different shades of grey in the one or more greyscale images;

generate a color representation of the plurality of body parts of the user simulating how the plurality of body parts of the user appear in the visible light frequency domain and in color at least in part by processing at least the one or more greyscale images using one or more trained machine learning models, wherein the one or more trained machine learning models are specific to the user based on prior user-specific training of the one or more trained machine learning models using training data having at least one color image of the user in the visible light frequency domain and at least one greyscale image of the user in the EM frequency domain, wherein the one or more trained machine learning models select a first user-specific color corresponding to a first pixel within the one or more greyscale images based on the first pixel being a first shade of grey, the first pixel being part of a first body part of the plurality of body parts, and based on the prior user-specific training of the one or more trained machine learning models, and wherein the one or more trained machine learning models select a second user-specific color corresponding to a second pixel within the one or more greyscale images based on the second pixel being a second shade of grey, the second pixel being part of a second body part of the plurality of body parts, and based on the prior user-specific training of the one or more trained machine learning models, wherein the prior user-specific training is based on training data that includes color training images in the visible light frequency domain converted into training images simulating representations of the EM frequency domain other than the visible light frequency domain; and output the color representation of the plurality of body parts of the user in the visible light frequency domain.

2. The apparatus of claim 1, wherein, to output the color representation, the one or more processors are configured to include the color representation in additional training data, the additional training data to be used to train a second set of one or more machine learning models using the color representation.

3. The apparatus of claim 1, wherein, to output the color representation, the one or more processors are configured to train a second set of one or more machine learning models using the color representation in as additional training data, wherein the second set of one or more machine learning models are configured to generate a three-dimensional mesh for an avatar of the user and a texture to apply to the three-dimensional mesh for the avatar of the user based on providing image data in the EM frequency domain to the second set of one or more machine learning models.

4. The apparatus of claim 1, wherein, to output the color representation, the one or more processors are configured to input the color representation into a second set of one or more machine learning models, wherein the second set of one or more machine learning models are configured to generate a three-dimensional mesh for an avatar of the user and a texture to apply to the three-dimensional mesh for the avatar of the user based on input of the color representation into the second set of one or more machine learning models.

5. The apparatus of claim 1, wherein the EM frequency domain includes least one of an ultraviolet (UV) frequency domain or a near-ultraviolet (NUV) frequency domain.

6. The apparatus of claim 5, wherein the EM frequency domain includes least one of an infrared (IR) frequency domain or a near-infrared (NIR) frequency domain.

7. The apparatus of claim 1, wherein the one or more processors are configured to:

store image data of the user in the visible light frequency domain, and wherein, to process at least the one or more greyscale images using the one or more trained machine learning models, the one or more processors are configured to process at least the image data and the one or more greyscale images using the one or more trained machine learning models.

8. The apparatus of claim 1, wherein the one or more greyscale images of the user depict the user in a pose, wherein the color representation represents the user in the pose, and wherein the pose includes at least one of a position of at least a part of the user, an orientation of at least the part of the user, or a facial expression of the user.

9. The apparatus of claim 1, wherein the color representation includes a color texture in the visible light frequency domain, wherein the color texture is configured to apply to a three-dimensional mesh representation of the user.

10. The apparatus of claim 1, wherein the color representation includes a three-dimensional model of the user that is textured using a color texture that includes a plurality of colors in the visible light frequency domain.

11. The apparatus of claim 1, wherein the color representation includes a color rendered image of a three-dimensional model of the user and from a predetermined perspective, wherein the color rendered image includes a plurality of colors in the visible light frequency domain.

12. The apparatus of claim 1, wherein the color representation includes a color image of the user that includes a plurality of colors in the visible light frequency domain.

13. The apparatus of claim 1, wherein the first body part is a patch of hair on the user, and wherein the second body part is a non-hair body part of the user that includes at least one of skin or iris, and wherein the second user-specific color is one of a skin color of the user or an iris color of the user.

14. The apparatus of claim 1, wherein the color training images and the training images in the training data depict the user.

15. The apparatus of claim 1, wherein the training images are generated by a second set of one or more machine learning models based on input of the color training images in the visible light frequency domain into the second set of one or more machine learning models.

16. The apparatus of claim 1, further comprising:

a display, wherein, to output the color representation, the one or more processors are configured to cause the color representation to be displayed using at least the display.

17. The apparatus of claim 1, further comprising:

a communication interface, wherein, to output the color representation, the one or more processors are configured to cause the color representation to be transmitted to at least a recipient device using at least the communication interface.

18. The apparatus of claim 1, wherein the apparatus includes at least one of a head-mounted display (HMD), a mobile handset, or a wireless communication device.

19. The apparatus of claim 1, wherein the apparatus includes one or more network servers, wherein, to receive the one or more greyscale images, the one or more processors are configured to receive the one or more greyscale images from a user device over a network, and wherein, to output the color representation, the one or more processors are configured to cause the color representation to be transmitted from the one or more network servers to the user device over the network.

20. A method of imaging, the method comprising:

receiving, from an image sensor, one or more greyscale images of a plurality of body parts of a user, wherein the image sensor captures light in an electromagnetic (EM) frequency domain other than a visible light frequency domain, and wherein the image sensor maps different frequencies of the light in the EM frequency domain to different shades of grey in the one or more greyscale images;

generating a color representation of the plurality of body parts of the user simulating how the plurality of body parts of the user appear in the visible light frequency domain and in color at least in part by processing at least the one or more greyscale images using one or more trained machine learning models, wherein the one or more trained machine learning models are specific to the user based on prior user-specific training of the one or more trained machine learning models using training data having at least one color image of the user in the visible light frequency domain and at least one greyscale image of the user in the EM frequency domain, wherein the one or more trained machine learning models select a first user-specific color corresponding to a first pixel within the one or more greyscale images based on the first pixel being a first shade of grey, the first pixel being part of a first body part of the plurality of body parts, and based on the prior user-specific training of the one or more trained machine learning models, and wherein the one or more trained machine learning models select a second user-specific color corresponding to a second pixel within the one or more greyscale images based on the second pixel being a second shade of grey, the second pixel being part of a second body part of the plurality of body parts, and based on the prior user-specific training of the one or more trained machine learning models, wherein the prior user-specific training is based on training data that includes color training images in the visible light frequency domain converted into training images simulating representations of the EM frequency domain other than the visible light frequency domain; and outputting the color representation of at least the part the user in the visible light frequency domain.

21. The method of claim 20, wherein outputting the color representation includes including the color representation in additional training data, the additional training data to be used to train a second set of one or more machine learning models using the color representation.

22. The method of claim 20, wherein outputting the color representation includes training a second set of one or more machine learning models using the color representation as additional training data, wherein the second set of one or more machine learning models are configured to generate a three-dimensional mesh for an avatar of the user and a color texture to apply to the three-dimensional mesh for the avatar of the user based on providing image data in the EM frequency domain into the second set of one or more machine learning models.

23. The method of claim 20, wherein outputting the color representation includes inputting the color representation into a second set of one or more machine learning models, wherein the second set of one or more machine learning models are configured to generate a three-dimensional mesh for an avatar of the user and a color texture to apply to the three-dimensional mesh for the avatar of the user based on input of the color representation into the second set of one or more machine learning models.

24. The method of claim 20, wherein the EM frequency domain includes least one of an ultraviolet (UV) frequency domain or a near-ultraviolet (NUV) frequency domain.

25. The method of claim 20, further comprising:

storing image data of the user in the visible light frequency domain, and wherein processing at least the one or more greyscale images using the one or more trained machine learning models includes processing at least the image data and the one or more greyscale images using the one or more trained machine learning models.

26. The method of claim 20, wherein the color representation includes a three-dimensional model of the user that is textured using a color texture in the visible light frequency domain.

27. The method of claim 20, wherein the color representation includes a color rendered image of a three-dimensional model of the user and from a predetermined perspective, wherein the color rendered image includes a plurality of colors in the visible light frequency domain.

28. The method of claim 20, wherein the first body part is a patch of hair on the user, and wherein the second body part is a non-hair body part of the user that includes at least one of skin or iris, and wherein the second user-specific color is one of a skin color of the user or an iris color of the user.

29. The method of claim 20, wherein the color training images and the training images in the training data depict the user.

30. The method of claim 20, wherein the training images are generated by a second set of one or more machine learning models based on input of the color training images in the visible light frequency domain into the second set of one or more machine learning models.

* * * * *